US012028166B2

United States Patent
Zhou et al.

(10) Patent No.: US 12,028,166 B2
(45) Date of Patent: Jul. 2, 2024

(54) FEEDBACK TRIGGERED Tx/Rx FOR A UE BASED ON MULTIPLE ACK/NACK

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/407,812

(22) Filed: Aug. 20, 2021

(65) Prior Publication Data

US 2022/0077967 A1   Mar. 10, 2022

Related U.S. Application Data

(60) Provisional application No. 63/075,051, filed on Sep. 4, 2020.

(51) Int. Cl.
| | |
|---|---|
| *H04L 1/1812* | (2023.01) |
| *H04L 1/1867* | (2023.01) |
| *H04L 5/00* | (2006.01) |
| *H04W 24/08* | (2009.01) |
| *H04W 72/23* | (2023.01) |
| *H04W 72/56* | (2023.01) |

(52) U.S. Cl.
CPC .......... *H04L 1/1819* (2013.01); *H04L 1/1896* (2013.01); *H04L 5/0051* (2013.01); *H04W 24/08* (2013.01); *H04W 72/23* (2023.01); *H04W 72/56* (2023.01)

(58) Field of Classification Search
CPC ... H04L 1/1819; H04L 1/1896; H04L 5/0051; H04L 1/1671; H04L 1/1854; H04L 5/0055; H04W 24/08; H04W 72/23; H04W 72/56

USPC .......................................................... 370/329
See application file for complete search history.

(56) References Cited

U.S. PATENT DOCUMENTS

| | | | |
|---|---|---|---|
| 2021/0050950 A1* | 2/2021 | Zhou | H04W 76/14 |
| 2021/0112544 A1* | 4/2021 | Chen | H04W 52/242 |

(Continued)

FOREIGN PATENT DOCUMENTS

| | | | |
|---|---|---|---|
| CN | 112399579 A | * | 2/2021 |
| EP | 3522592 A1 | | 8/2019 |
| WO | 2011146653 A1 | | 11/2011 |

OTHER PUBLICATIONS

International Search Report and Written Opinion—PCT/US2021/047141—ISA/EPO—dated Nov. 26, 2021.

*Primary Examiner* — Rownak Islam
(74) *Attorney, Agent, or Firm* — Guang Yu Zhang; Procopio, Cory, Hargreaves & Savitch LLP

(57) ABSTRACT

This disclosure provides systems, devices, apparatus, and methods, including computer programs encoded on storage media, for ACK/NACK-triggered communications with a UE based on multiple ACK/NACK bits in HARQ feedback from a UE. The UE may receive a configuration for a resource, monitor for one or more PDSCH transmissions, and transmit an uplink transmission including HARQ feedback carrying multiple NACK or ACK bits for the one or more PDSCH transmissions. The UE may transmit or receive communication in the resource based on a trigger in the HARQ feedback for transmission or reception of the communication in the resource.

27 Claims, 16 Drawing Sheets

(56) References Cited

U.S. PATENT DOCUMENTS

2021/0377876 A1* 12/2021 Jeon .................. H04W 24/08
2022/0393799 A1* 12/2022 Li ..................... H04L 1/1822

* cited by examiner

FEEDBACK TRIGGERED Tx/Rx FOR A UE BASED ON MULTIPLE ACK/NACK

CROSS REFERENCE TO RELATED APPLICATION(S)

This application claims the benefit of and priority to U.S. Provisional Application Ser. No. 63/075,051, entitled "Feedback Triggered Tx/Rx for a UE based on Multiple ACK/NACK" and filed on Sep. 4, 2020, which is expressly incorporated by reference herein in its entirety.

TECHNICAL FIELD

The present disclosure relates generally to communication systems, and more particularly, to wireless communication including feedback triggered reception/transmission (Tx/Rx).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a configuration for a resource; monitor for one or more PDSCH transmissions; transmit an uplink transmission including hybrid automatic repeat request (HARQ) feedback carrying multiple negative-acknowledgment (NACK) or acknowledgement (ACK) bits for the one or more PDSCH transmissions; and transmit or receive communication in the resource based on a trigger in the HARQ feedback for transmission or reception of the communication in the resource.

In an aspect of the disclosure, a method, a computer-readable medium, and an apparatus are provided. The apparatus may transmit a configuration for a resource associated with one or more PDSCH transmissions; receive, from a UE, an uplink transmission including HARQ feedback carrying multiple NACK or ACK bits for the one or more PDSCH transmissions; and transmit a channel state information-reference signal (CSI-RS) or receive a sounding reference signal (SRS) in the resource based on a trigger in the HARQ feedback for transmission of the CSI-RS or reception of the SRS in the resource.

In an aspect of the disclosure, a method, a computer-readable medium, and an apparatus are provided. The apparatus may receive, from a base station, a configuration for a resource associated with one or more PDSCH transmissions; receive an uplink transmission from a second wireless device including HARQ feedback carrying multiple NACK or ACK bits for the one or more PDSCH transmissions; and transmit a sidelink retransmission of at least one of the one or more PDSCH transmissions in the resource based on a trigger in the HARQ feedback for transmission of the sidelink retransmission in the resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
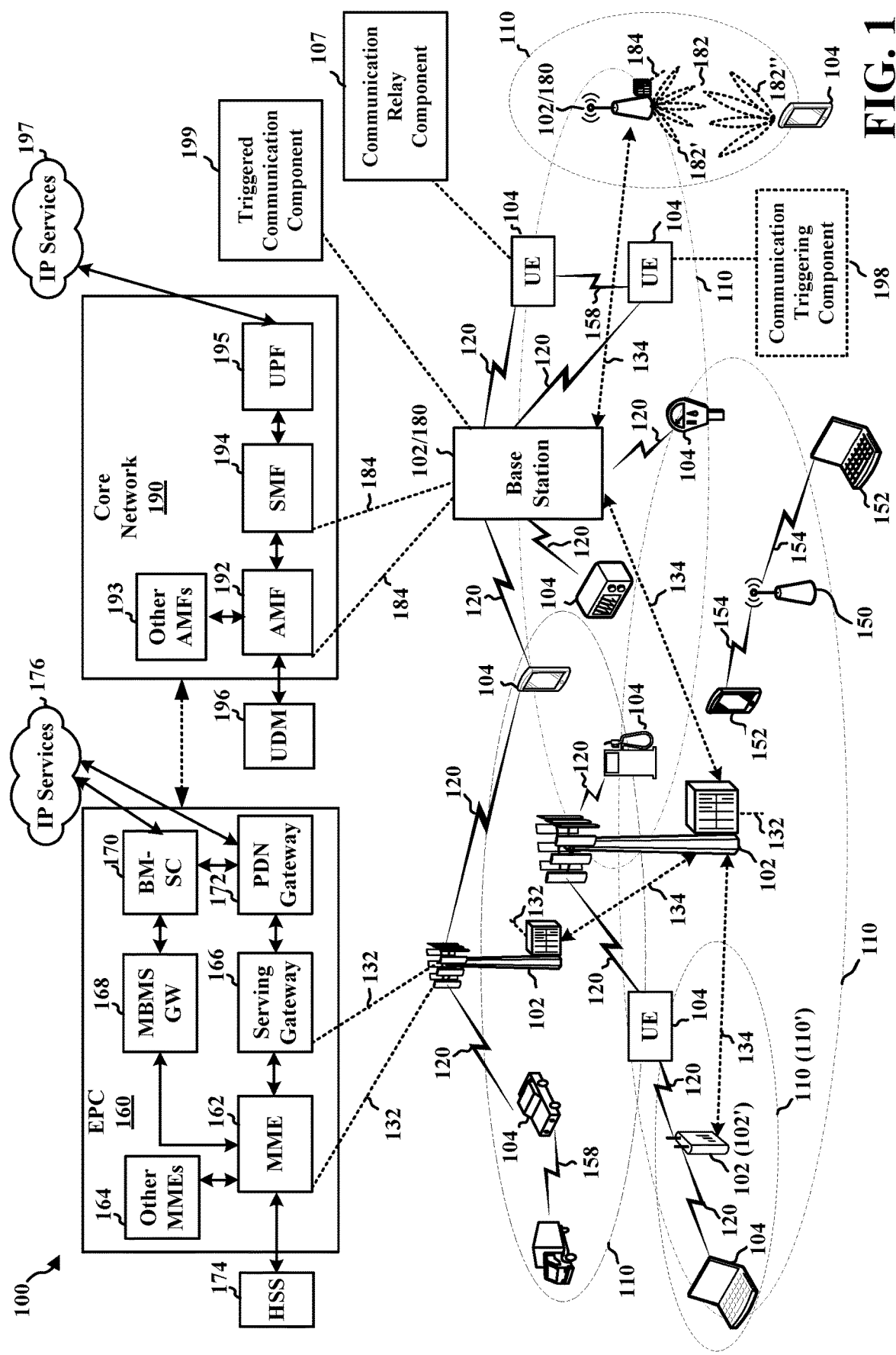
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In ultra-reliable low-latency communication (URLLC) and industrial internet of things (IIoT), a shortened time period for retransmission and/or channel sounding may be used to decrease latency after a failed physical downlink shared channel (PDSCH) transmission from a base station to a user equipment (UE). In examples, downlink control information (DCI) scheduling overhead and latency may be decreased based on retransmission and/or channel sounding that is triggered directly by a negative-acknowledgment (NACK) from a UE. As the NACK may be indicative of the failed PDSCH transmission, the NACK may be used as a triggering mechanism for triggering a communication between the UE and the base station with decreased latency.

In some configurations, the NACK may be used to trigger a sounding reference signal (SRS) transmission from the UE, a channel state information-reference signal (CSI-RS) transmission from the base station, a sidelink retransmission from a relay UE, etc. While the triggering mechanism may be based on transmission of the NACK from the UE (or in some configurations transmission of an acknowledgment (ACK) from the UE), an uplink (UL) transmission may include a plurality of ACK/NACK bits corresponding to a plurality of PDSCH transmissions. Thus, activation of the triggering mechanism may be appropriate for a subset of ACK/NACK bits (e.g., that correspond to NACKs) in the plurality of ACK/NACK bits, but not for a remainder of the ACK/NACK bits (e.g., that correspond to ACKs).

Given that a single UL transmission may include multiple ACK/NACK bits corresponding to multiple PDSCH transmissions, some of the bits in the UL transmission may correspond to ACKs and other bits in the UL transmission may correspond to NACKs. That is, the single UL transmission, which may include one bit for each of the multiple PDSCH transmissions, may have one or more ACK bits and/or one or more NACK bits. Therefore, the triggering mechanism for the SRS transmission from the UE, the CSI-RS transmission from the base station, and the sidelink retransmission from the relay UE may be based on the ACK/NACKs of the single UL transmission. The base station or the UE may have to determine the combined feedback, e.g., multiple bit HARQ feedback, to initiate the triggering mechanism. Aspects presented herein enable a base station and a UE to determine how to apply a triggering protocol for combined feedback for multiple PDSCH transmissions.

In a first aspect, a transmission/reception may be triggered if at least one NACK bit is included in the plurality of ACK/NACK bits associated with the UL transmission. In a second aspect, the transmission/reception may be triggered if all of the plurality of ACK/NACK bits associated with the UL transmission correspond to NACKs. In a third aspect, the transmission/reception may be triggered if a percentage of NACK bits in the plurality of ACK/NACK bits exceeds a threshold percentage. The threshold percentage may be a fixed threshold (e.g., based on a defined protocol) or a dynamically signaled threshold (e.g., via DCI, medium access control-control element (MAC-CE), radio resource control (RRC), etc.). In further configurations, each of the three aspect may be implemented based on ACK bits triggering the transmission/reception, rather than NACK bits.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a communication triggering component 198 configured to receive a configuration for a resource; monitor for one or more PDSCH transmissions; transmit an uplink transmission including HARQ feedback carrying multiple NACK or ACK bits for the one or more PDSCH transmissions; and transmit or receive communication in the configured resource based on A trigger in the HARQ feedback for transmission or reception of the communication in the configured resource. In some examples, the trigger may be at least one NACK bit. In some examples, the trigger may be a percentage of NACK bits meeting a threshold. In some examples, the trigger may be each of the ACK/NACK bits being a NACK. In some examples, the trigger may be at least one ACK bit. In some examples, the trigger may be a percentage of ACK bits meeting a threshold. In some examples, the trigger may be each of the ACK/NACK bits being an ACK.

In certain aspects, the base station 102 or 180 may include a triggered communication component 199 configured to transmit a configuration for a resource associated with one or more PDSCH transmissions; receive, from a UE, an uplink transmission including HARQ feedback carrying multiple NACK or ACK bits for the one or more PDSCH transmissions; and transmit a CSI-RS or receive an SRS in the configured resource based on a trigger in the HARQ feedback for transmission of the CSI-RS or reception of the SRS in the configured resource.

In certain aspects, the a wireless device (e.g., a relay UE) may include a communication relay component 107 configured to receive, from a base station, a configuration for a resource associated with one or more PDSCH transmissions; receive an uplink transmission from a second wireless device including HARQ feedback carrying multiple NACK or ACK bits for the one or more PDSCH transmissions; and transmit a sidelink retransmission of at least one of the one or more PDSCH transmissions in the configured resource based on a trigger in the HARQ feedback for transmission of the sidelink retransmission in the configured resource.

Although the following description may be focused on 5G NR, the concepts described herein may be applicable to other similar areas, such as LTE, LTE-A, CDMA, GSM, and other wireless technologies.

Figure 2:
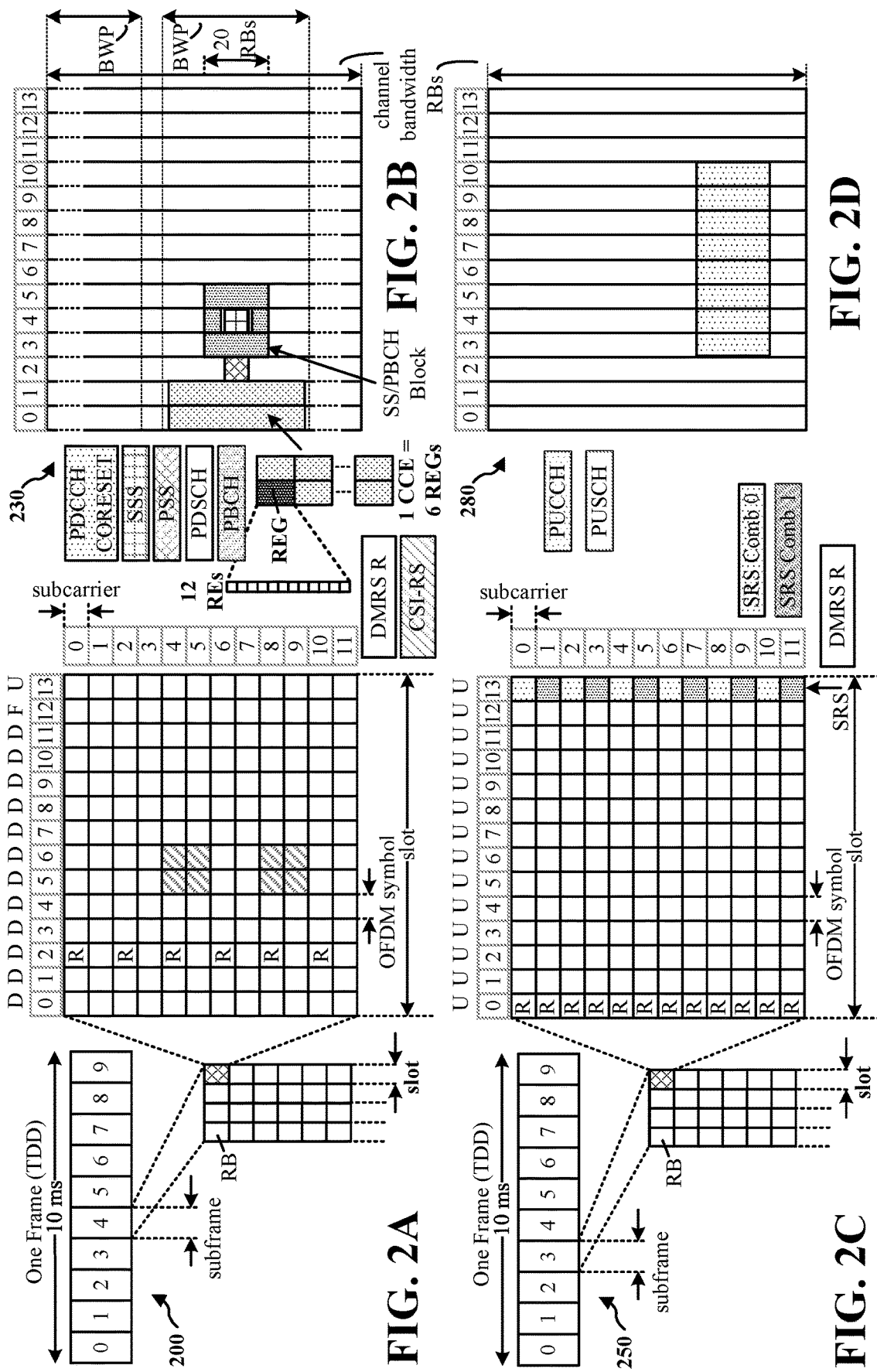
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI), or semi-statically/statically through RRC signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and CSI-RS for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
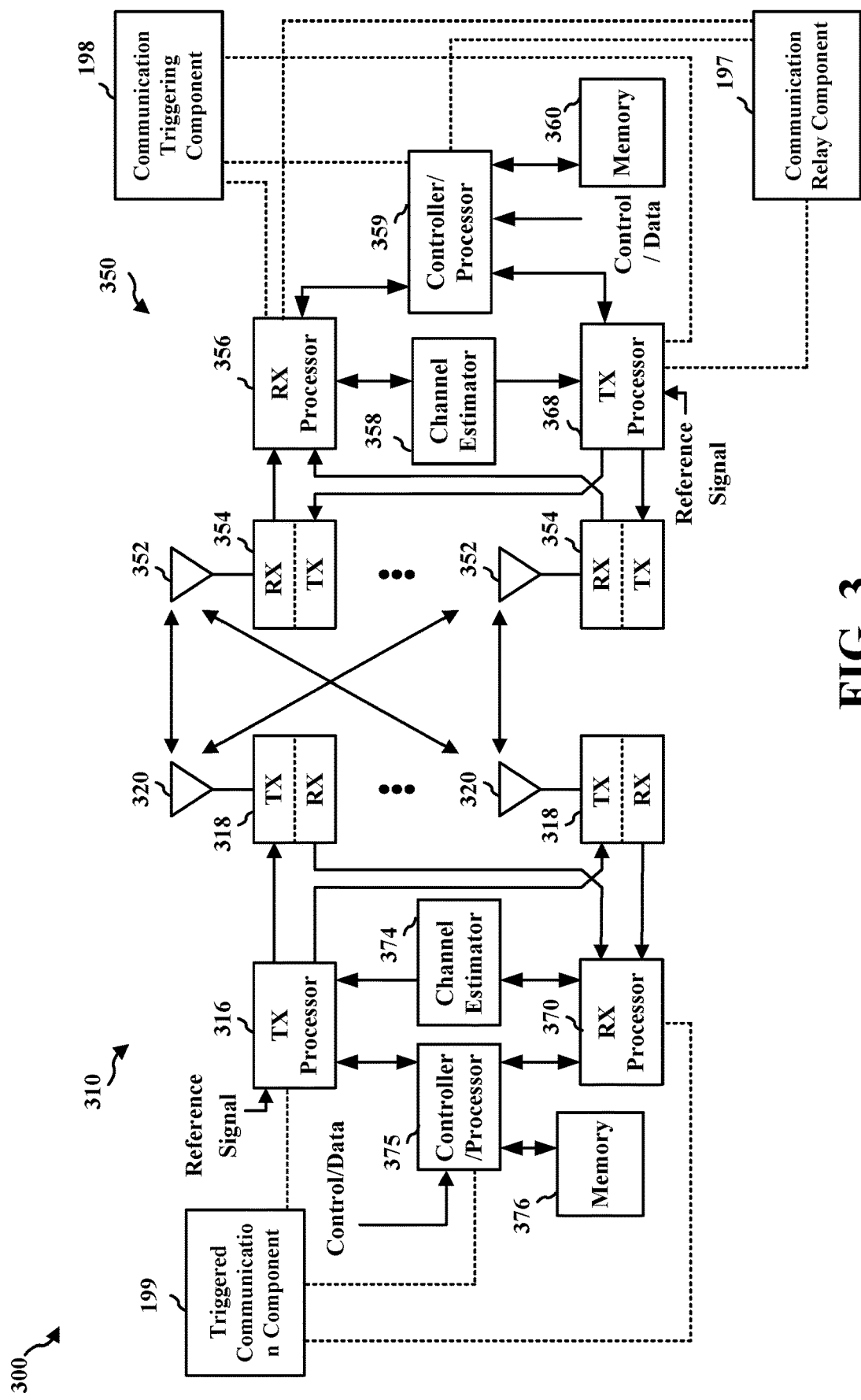
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the communication relay component 107 of FIG. 1.

At least one of the TX processor 368, the RX processor 356, and the controller/processor 359 may be configured to perform aspects in connection with the communication triggering component 198 of FIG. 1.

At least one of the TX processor 316, the RX processor 370, and the controller/processor 375 may be configured to perform aspects in connection with the triggered communication component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
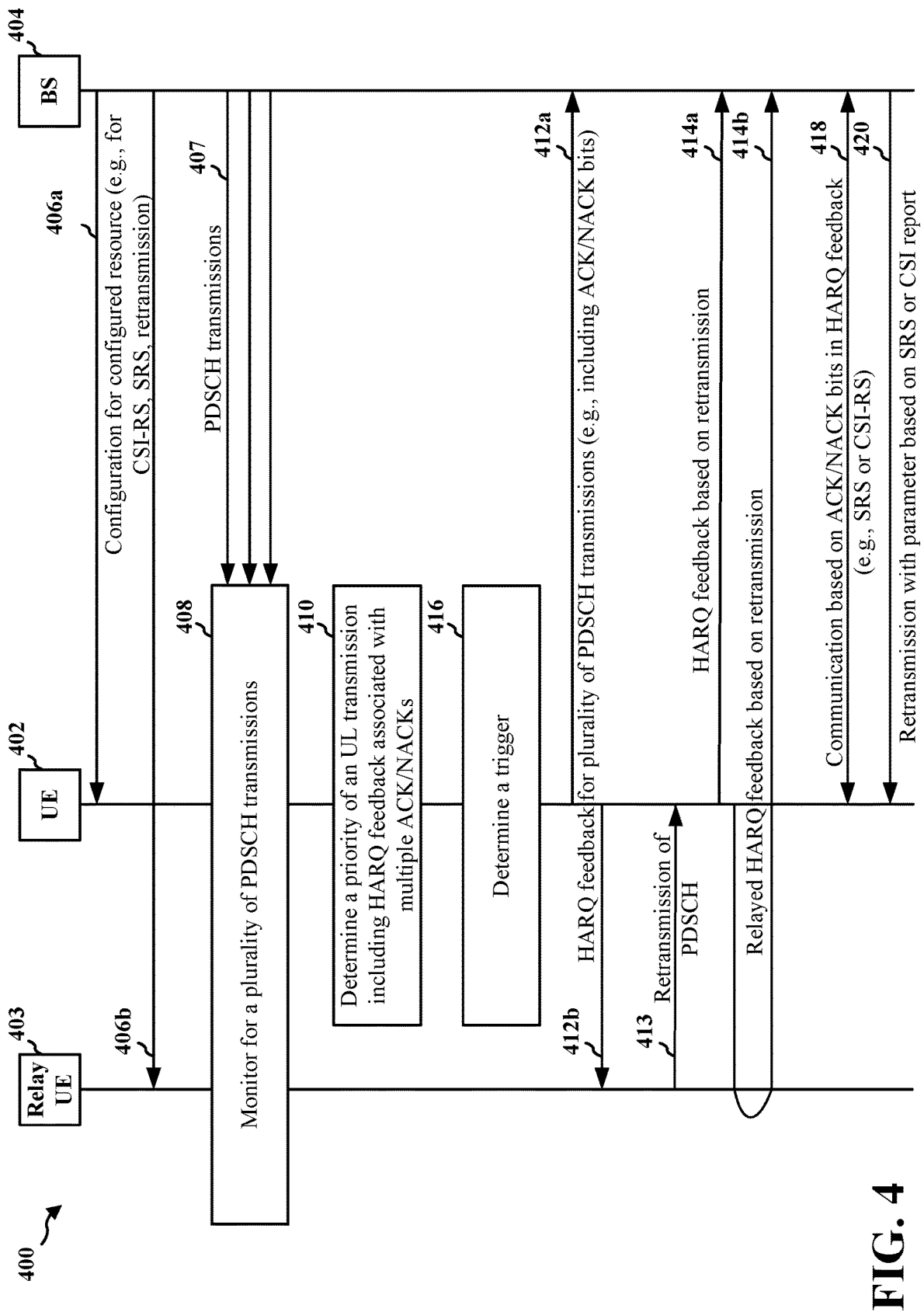
FIG. 4 is a call flow diagram illustrating communications between a base station, a UE, and a relay UE.

FIG. 4 is a call flow diagram 400 illustrating communications between a base station 404, a UE 402, and a relay UE 403. The term "relay UE" is used to identify the UE 403. The relay UE 403 may be any type of UE. At 406a, the base station 404 may transmit a configuration for resources to the UE 402. The resources may be referred to herein as configured resources. The transmitted configuration for the UE 402 may also be received, at 406b, by the relay UE 403. Both the UE 402 and the relay UE 403 may monitor, at 408, for a plurality of PDSCH transmissions 407 from the base station 404. In some examples, the PDSCH transmissions may be SPS transmissions. At 410, the UE 402 may determine a priority of an UL transmission including HARQ feedback associated with multiple ACK/NACKs. The priority may be a fixed priority determined by the UE 402 or a dynamically signaled priority indicated by the base station 404.

At 416, the UE 402 may determine a trigger for a communication between the UE 402 and the base station 404. In some examples, the trigger may be at least one NACK bit. In some examples, the trigger may be a percentage of NACK bits meeting a threshold. In some examples, the trigger may be each of the ACK/NACK bits being a NACK. In some examples, the trigger may be at least one ACK bit. In some examples, the trigger may be a percentage of ACK bits meeting a threshold. In some examples, the trigger may be each of the ACK/NACK bits being an ACK.

In some examples, the UE may determine the trigger to apply based on a HARQ-ACK codebook type. For example, a HARQ Type 1 codebook may correspond to a trigger for a first communication technique and a HARQ Type 2 codebook may correspond to a trigger for a second communication technique. As an example, the first communication technique may include the sidelink retransmission being triggered based on a first metric corresponding to at least one NACK being included in the multiple ACK/NACK bits of the HARQ feedback 414a, a second metric corresponding to all of the multiple ACK/NACK bits indicating a NACK, or a third metric corresponding to a threshold percentage of the ACK/NACK bits indicating a NACK. The second communication technique may include the sidelink retransmission being triggered based on a different one of the first metric, the second metric, or the third metric.

In some examples, the UE 402 may receive a retransmission directly from the base station 404. In other examples, the UE 402 may receive a retransmission from a sidelink device, such as the relay UE 403.

For example, at 412a, the UE 402 may transmit, to the base station 404, the HARQ feedback including the multiple ACK/NACKs for the plurality of PDSCH transmissions monitored, at 407. The transmitted HARQ feedback may also be received, at 412b, by the relay UE 403. If the HARQ feedback triggers the relay UE 403 to retransmit the one or more PDSCH, the relay UE 403 may retransmit, at 413, the one or more PDSCH to the UE 402, e.g., using the resources configured at 406b. At 414a, the UE 402 may transmit further HARQ feedback to the base station 404 based on the retransmission received, at 413. The further HARQ feedback may also be received by the relay UE 403, such that the relay UE 403 may relay, at 414b, the further HARQ feedback to the base station 404 based on the retransmission, at 413.

Figure 5:
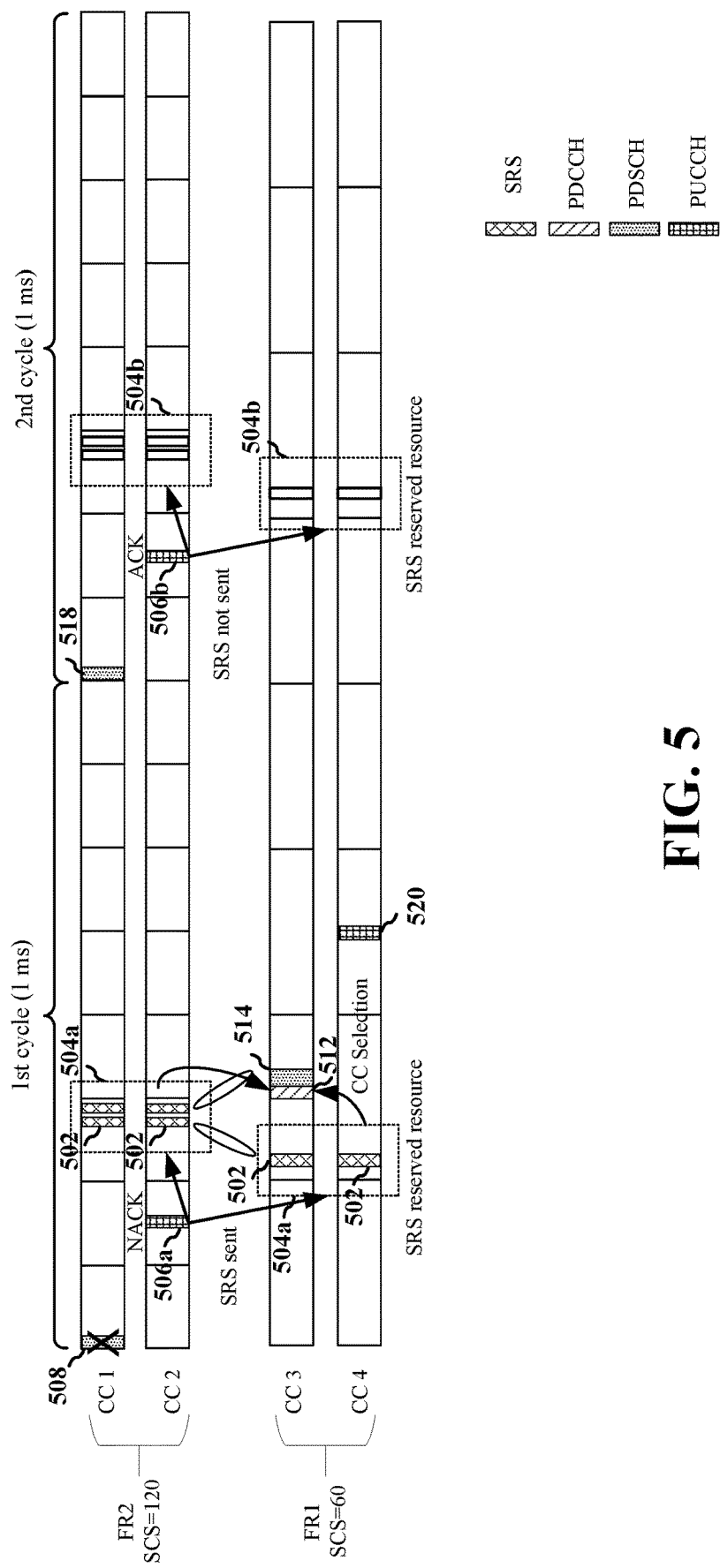
FIG. 5 is a diagram illustrating a negative-acknowledgment (NACK)-triggered sounding reference signal (SRS) transmission from a UE.

In other examples, rather than monitoring for a sidelink retransmission, the UE 402 may transmit an SRS communication, e.g., at 418, to the base station 404 based on a NACK trigger in the transmitted HARQ feedback. FIG. 5 illustrates an example of the UE 402 transmitting an SRS based on the NACK bits in the transmitted HARQ feedback. As described in more detail in connection with FIG. 5, the base station 404 may use the SRS to perform fast component carrier (CC) reselection for a retransmission 420 to the UE 402.

Figure 6:
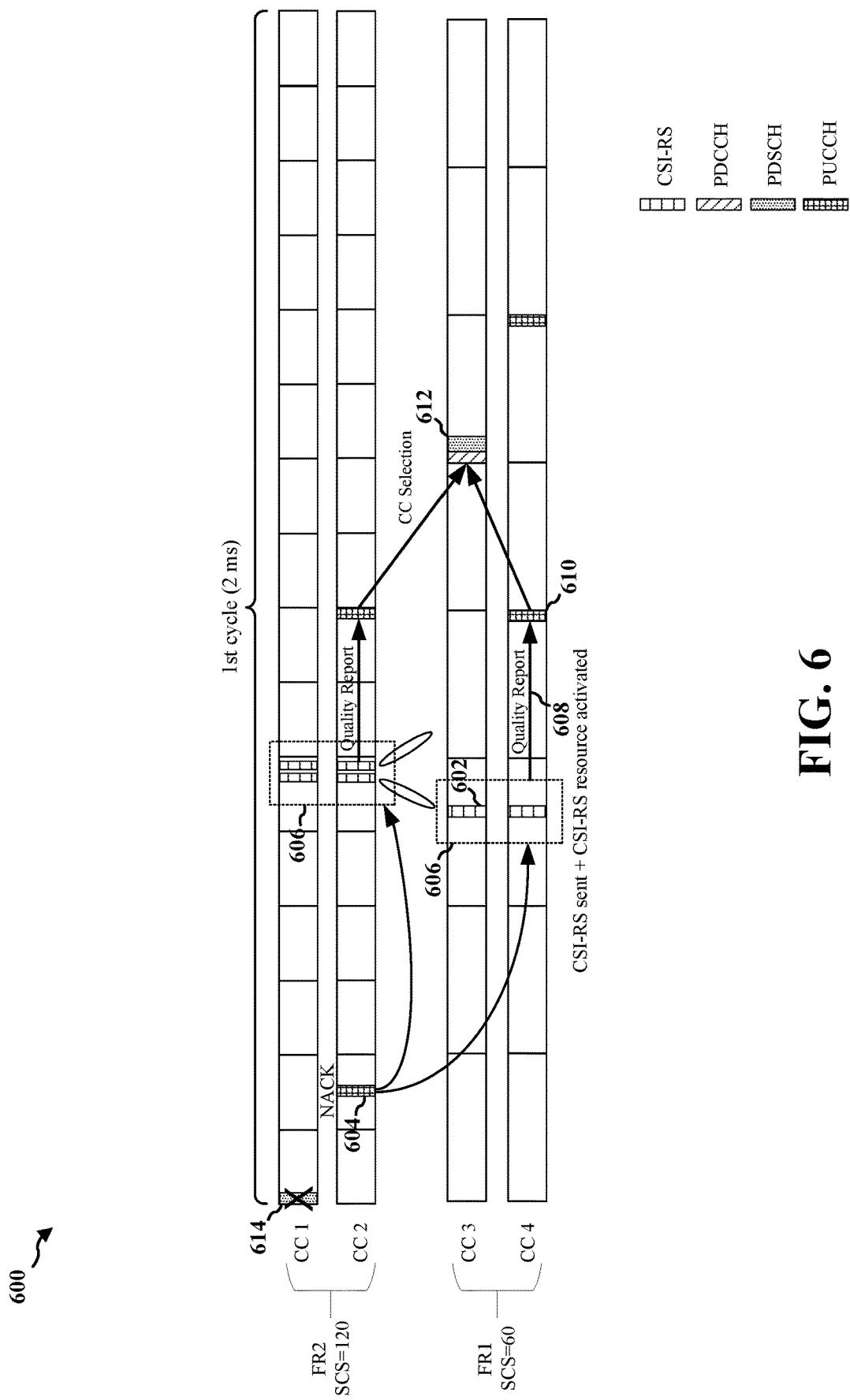
FIG. 6 is a diagram illustrating a NACK-triggered channel state information-reference signal (CSI-RS) transmission from a base station.

In some examples, at 418, the base station 404 may transmit CSI-RS to the UE 402 based on the NACK bits in the received HARQ feedback, e.g., based on the trigger in the NACK bits of the HARQ feedback. FIG. 6 illustrates an example of the base station transmitting CSI-RS based on the NACK bits in the transmitted HARQ feedback. The UE 402 may provide a CSI report to the base station 404 based on the CSI-RS. As described in more detail in connection with FIG. 6, the base station 404 may use the CSI-RS to perform fast CC reselection and report to the base station 404 for a retransmission 420 to the UE 402.

Figure 7:
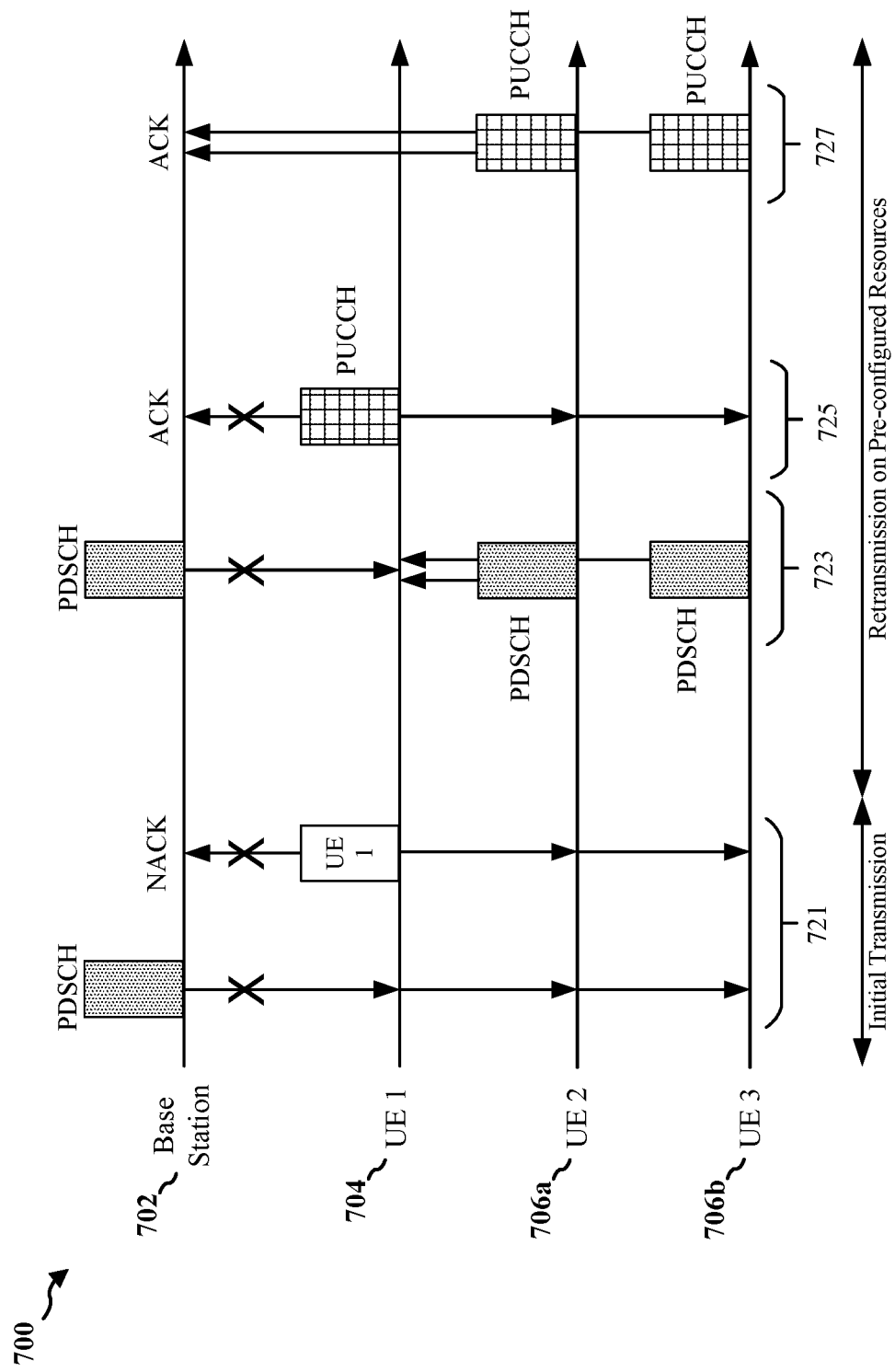
FIG. 7 is a diagram illustrating a NACK-triggered retransmission from a relay UE.

FIGS. 5-7 illustrate diagrams 500-700 for NACK-triggered communications. In URLLC and IIoT, a shortened time period for retransmission and/or channel sounding may be used to decrease latency after a failed PDSCH transmission from a base station. For instance, DCI scheduling overhead and latency may be decreased based on retransmission and/or channel sounding that is triggered based on a NACK from a UE. Since the NACK may be indicative of the failed PDSCH transmission and a reduction to subsequent DCI scheduling processes, transmission of the NACK from the UE may be used as a triggering mechanism for providing the decreased latency via the triggered communication. For example, the NACK may be used to trigger an SRS transmission from the UE, such as illustrated in FIG. 5, a CSI-RS transmission from the base station, such as illustrated in FIG. 6, a sidelink retransmission from a relay UE, such as illustrated in FIG. 7, etc. In some cases, such as in described in connection with FIG. 6, the UE may transmit a NACK-triggered aperiodic-CSI (A-CSI) report, e.g., for URLLC procedures. While the triggering mechanism may be based on transmission of the NACK from the UE (or in some configurations transmission of an ACK from the UE), some UL transmissions may include a plurality of ACK/NACK bits corresponding to a plurality of PDSCH transmissions. Thus, activation of the triggering mechanism may be appropriate for a subset of ACK/NACK bits in the plurality of ACK/NACK bits, but not for a remainder of the ACK/NACK bits in the plurality of ACK/NACK bits.

In a first aspect, a transmission/reception may be triggered if at least one NACK bit is included in the plurality of ACK/NACK bits associated with the UL transmission of the HARQ feedback. For example, if the HARQ feedback includes five ACK/NACK bits, where four of the bits correspond to ACK and one bit corresponds to NACK, the triggering mechanism may be activated based on the one NACK bit included in the UL transmission. If the HARQ feedback includes only ACK feedback, the UE and the base station may refrain from performing the transmission/reception. The transmission/reception may include any of an SRS transmission including aspects described in connection with FIG. 5, a CSI-RS reception and a CSI report including aspects described in connection with FIG. 6, or a sidelink retransmission including aspects described in connection with FIG. 7.

In a second aspect, the transmission/reception may be triggered if all of the plurality of ACK/NACK bits associated with the UL transmission of the HARQ feedback correspond to NACKs. For example, if the HARQ feedback includes five ACK/NACK bits and all five bits correspond to NACKs, the triggering mechanism may be activated. However, if even one of the five ACK/NACK bits corresponds to ACK, the triggering mechanism may not be activated based on the forgoing aspect. The transmission/reception may include any of an SRS transmission including aspects described in connection with FIG. 5, CSI-RS reception and CSI reporting including aspects described in connection with FIG. 6, or a sidelink retransmission including aspects described in connection with FIG. 7.

In a third aspect, the transmission/reception may be triggered if a percentage of NACK bits in the plurality of ACK/NACK bits exceeds a threshold percentage. For example, if the UL transmission of the HARQ feedback includes five ACK/NACK bits and the threshold percentage is set at 59%, the triggering mechanism may be activated if three or more of the five ACK/NACK bits (e.g., 60% percent or more) correspond to NACKs. If less than 59% of the HARQ feedback indicates a NACK (e.g., 2 bits or less), the UE and/or the base station may refrain from preforming the transmission/reception. The threshold percentage may be a fixed threshold (e.g., based on a defined protocol) or a dynamically signaled threshold (e.g., from a transmitter to a receiver via DCI, MAC-CE, RRC, etc.). In some cases, a base station may be the transmitter that indicates the threshold to the receiver/UE. In other cases, a UE may be the transmitter that indicates the threshold to the receiver/base station. The transmission/reception may include any of an SRS transmission including aspects described in connection with FIG. 5, CSI-RS reception and CSI reporting including aspects described in connection with FIG. 6, or a sidelink retransmission including aspects described in connection with FIG. 7.

In some examples, selecting/performing procedures based on multiple bits of ACK/NACK feedback may be based on a HARQ-ACK codebook type. For instance, in non-limiting examples, the UE and/or the base station may perform the transmission/reception based on at least one NACK being implemented for HARQ Type 2 codebooks. The UE and/or the base station may also perform the transmission/reception based on all of the ACK/NACK bits corresponding to NACKs being implemented for HARQ Type 1 codebooks, etc.

In further configurations, each technique may be implemented based on triggering the transmission/reception based on ACK bits, rather than NACK bits. That is, transmission/reception may be triggered based on the first aspect if at least one ACK bit is included in the plurality of ACK/NACK bits associated with the UL transmission; transmission/reception may be triggered based on the second aspect if all of the plurality of ACK/NACK bits associated with the UL transmission correspond to ACKs; and/or transmission/reception may be triggered based on the third aspect if a percentage of ACK bits in the plurality of ACK/NACK bits exceeds a threshold percentage. Moreover, the diagrams 500-700 may be reconfigured based on ACK-triggered communications, rather than NACK-triggered communications.

UL feedback including multiple ACK/NACK bits may have high PHY priority or low PHY priority, which may be either configured per UL resource or dynamically indicated in DCI scheduling/activation of the PDSCH transmission. The priority for the UL feedback including the multiple ACK/NACK bits may be a fixed priority (e.g., based on a defined protocol for the UL feedback) or a dynamically signaled priority (e.g., from a transmitter to a receiver via DCI, MAC-CE, RRC, etc.). In some cases, a base station may be the transmitter that indicates the priority to the receiver/UE. In other cases, a UE may be the transmitter that indicates the priority to the receiver/base station.

The diagram 500 illustrates a first example of a NACK-triggered communication, where transmission of an SRS 502 is associated with a reserved resource 504*a* may be triggered by ACK/NACK bits of HARQ feedback 506*a*. The aspects illustrated in FIG. 5 may provide dynamically activated resources for channel measurements, in accordance with certain aspects of the present disclosure. As illustrated, decoding of the data transmission (e.g., PDSCH 508) may have failed on CC1 (e.g., a serving CC). A control message (e.g., PUCCH) may be transmitted by the UE. In some cases, the control message may indicate a NACK, indicating to the UE that decoding of the data transmission has failed. In other cases, the UE may not indicate an ACK or a NACK corresponding to the data transmission, which may be referred to as a discontinuous transmission (DTX). For example, the UE may not have received control signaling for scheduling of the PDSCH 508 and therefore, may not send an ACK or a NACK for the data transmission.

As illustrated, in response to the failure of decoding of the PDSCH 508, prescheduled resources on candidate CCs (e.g., CC3 or CC4) for transmission of SRS 502 (or reception of CSI-RS) may be activated. The UE may transmit SRS 502 using the prescheduled resources, which may be used by the base station to perform channel measurements and select the best candidate CC for downlink data transmission. For example, the base station may transmit a control message 512 (e.g., PDCCH) to schedule the downlink data transmission 514 (e.g., PDSCH) on CC3. In certain aspects, the UE may send an uplink control message 520 (e.g., PUCCH), indicating an ACK or a NACK based on whether the decoding of the data transmission 514 was successful.

As illustrated, during the second cycle, the data transmission 518 may be decoded successfully. Thus, the UE may transmit an uplink control message 506*b* (e.g., PUCCH) acknowledging the data transmission 518. Therefore, the prescheduled resources for SRS may be deactivated (e.g., cancelled or reassigned to other UEs).

In order to reduce overhead, channel measurement resources may be preconfigured on candidate CCs, but activated when certain conditions apply. Channel measurement resources may include SRS, CSI-RS, and corresponding UL reporting resources in cases of CSI-RS. The resources may be activated implicitly when NACK/DTX is sent/received for a previous failed transmission. In certain aspects, the prescheduled resources may be activated explicitly by an indicator from the UE to the base station when a current CC quality (e.g., signal to noise plus interference ratio (SINR) or reference signal receive power (RSRP)) is below a threshold, which may be configured by the base station. As described herein, corresponding time/frequency resources may be canceled or reassigned to other UEs if the resources are not activated.

In certain aspects, the reference signals may be configured with a beam sweep pattern on a candidate CC, where SRS/CSI-RS is sent/received by different beam pair links. For example, each SRS 502 may be transmitted via different beams, which may allow the signaling quality measurements to be performed for the different beams to determine a beam to use for the downlink data transmission. In certain aspects, to further reduce overhead, multiple UEs may share a pool of SRS resources and indicate a selected SRS resource in NACK (e.g., control message). For example, the resources may be part of a shared (e.g., common) pool of resources of multiple UEs. Thus, during different cycles, different UEs may use the resources (e.g., for receiving CSI-RS) based on the UE that is to perform channel measurements due to a degraded signal quality of a current CC of the UE.

The UE may transmit SRS 502 that is triggered based on the UE transmitting a NACK in the ACK/NACK bits to the base station, transmitting a threshold amount of NACK bits to the base station, or transmitting all NACK bits to the base station. The SRS 502 may be used by the base station to select a different beam for retransmission of the PDSCH 508. Rather than being dynamically activated/scheduled based on the HARQ feedback 506*a*, SRS resources (e.g., 504*a*-504*b*) may be reserved resources associated with the ACK/NACK transmission, e.g., with a short offset from an ACK/NACK transmission (e.g., 506*a*-506*b*).

If an UL transmission (e.g., PUCCH/PUSCH) corresponds to the HARQ feedback 506*a*, the SRS 502 may be transmitted on the reserved resource 504*a* with reduced latency for CC and/or subband reselection by the base station. For example, the SRS 502 may be transmitted on a different CC or subband for the base station to determine the different beam to be used for retransmission of the PDSCH 508. As SRS resources may be wideband resources, the SRS 502 may be transmitted on a plurality of CCs (e.g., CC1-CC4) for the base station to estimate/measure the plurality of CCs and determine the different CC or subband to be selected for retransmitting the PDSCH 508.

If the ACK/NACK bits of the HARQ feedback do not satisfy the NACK trigger protocol, transmission of the SRS 502 may not occur on the reserved resource 504*b* and the reserved resource 504b may be utilized for a different purpose. Thus, by using the ACK/NACK bits of the HARQ feedback 506a to trigger transmission of the SRS 502, rather than having the SRS 502 being scheduled after each ACK/NACK 506a-506b, interference may be reduced based on reducing a number of the SRS transmissions when the PDSCH is successfully received. UL resources may be conserved by using SRS 502 to indicate ACK/NACK (e.g. DTX of the SRS 502 may be indicative of an ACK, while transmission of the SRS 502 may be indicative of at least one NACK).

FIG. 6 illustrates an example, similar to FIG. 5, in which an CSI-RS transmission and a CSI report may be triggered by at least one NACK. In response to the indication of the failure to decode a data transmission, CSI-RS may be activated on prescheduled resources on candidate CCs.

The diagram 600 illustrates a second example of a NACK-triggered communication, where a CSI-RS transmission 602 from a base station may be triggered by ACK/NACK bits of HARQ feedback 604. For example, the transmission of the CSI-RS 602 from the base station, and the measurement of the CSI-RS by the UE, may be triggered based on the UE transmitting a NACK in the ACK/NACK bits to the base station, transmitting a threshold amount of NACK bits to the base station, or transmitting all NACK bits to the base station.

The CSI-RS resources and/or the CSI report resources may be activated implicitly on the candidate CCs when NACK/DTX is sent/received for a previous failed transmission. In certain aspects, the prescheduled resources may be activated based on an indication from the UE to the base station when a current CC quality (e.g., SINR or RSRP) is below a threshold, which can be configured by the base station. As described herein, corresponding time/frequency resources may be canceled or reassigned to other UEs if the resources are not activated.

In certain aspects, the reference signals may be configured with a beam sweep pattern on a candidate CC, where SRS/CSI-RS is sent/received by different beam pair links. For example, the resources may be part of a shared (e.g., common) pool of resources of multiple UEs. Thus, during different cycles, different UEs may use the resources (e.g., for receiving CSI-RS) based on the UE that is to perform channel measurements due to a degraded signal quality of a current CC of the UE.

For example, the HARQ feedback 604 may activate CSI-RS resources 606 for transmitting the CSI-RS 602, whereas an ACK may not activate the CSI-RS resources 606. Transmitted CSI-RS 602 may be measured by the UE and the UE may indicate corresponding information to the base station. For example, the UE may generate a quality report 608 based on the measured CSI-RS 602 triggered by the ACK/NACK bits of the HARQ feedback 604 and transmit the quality report 608 to the base station on UL resources 610. Based on the indicated quality report 608, the base station may select a parameter, such as a CC (e.g., CC 3), for transmitting a PDSCH 612. The PDSCH 612 may be a retransmission of the PDSCH 614, in some examples.

For selecting the CC to transmit the PDSCH 612, a quality of the CC may be determined (e.g., if a cycle duration is long) based on the CSI-RS measurement. The CSI-RS 602 may be transmitted on non-serving CCs if quality information for a serving CC is being carried with the HARQ feedback 604 (e.g., based on SPS DMRS on FR2). If the HARQ feedback 604 does not carry the quality information of the serving CC, the CSI-RS 602 may be transmitted on both FR1 and FR2. In order to decrease overhead, the CSI-RS 602 and corresponding UL resources 610 for the quality report 608 may be preconfigured, but activated after the DTX/NACK (e.g., HARQ feedback 604) is sent/received for a previous transmission (e.g., PDSCH 614). The CSI-RS 602 and corresponding UL resources 610 may be deactivated if an ACK is sent/received. In some examples, NACK-triggered CSI-RS 602 may reduce DCI and scheduling offsets in comparison to DCI-based CSI-RS, which may be at least greater than a beam switch latency threshold for beam sweep-based CSI-RS transmission on FR2.

The diagram 700 illustrates a third example of an ACK/NACK-triggered communication, where a relay UE 706a/706b (e.g., UE 2 and/or UE 3) or other sidelink device may retransmit a PDSCH from a base station 702 to a target UE 704 (e.g., UE 1) and/or relay ACK/NACK feedback from the target UE 704 to the base station 702. In examples, the relay UE 706a/706b may be a sidelink UE or a base station that relays communications based on receiving a trigger in ACK/NACK bits of HARQ feedback from the target UE 704. For example, the relay UE may retransmit one or more PDSCH transmissions to the target UE 704 that is triggered based on the target UE 704 transmitting a NACK in the ACK/NACK bits to the base station, transmitting a threshold amount of NACK bits to the base station, or transmitting all NACK bits to the base station.

At 721, the target UE 704 may fail to receive semi-persistent scheduling (SPS) PDSCH in an initial transmission for the target UE 704. However, the SPS PDSCH may be received by one or more of the relay UEs 706a-706b.

Accordingly, the target UE 704 may transmit at least one NACK in the ACK/NACK bits to the base station 702 for the initial transmission, which may not be received by the base station 702, but which may be received by the one or more relay UEs 706a-706b. Based on the NACK, the target UE 704, the relay UEs 706a-706b, and/or the base station 702 may determine that configured resources (which were previously configured) are activated for retransmission of the PDSCH to the target UE 704.

At 723, the base station 702 may retransmit the PDSCH on the configured resources, which may again not be received by the target UE 704, but which may be received by the relay UEs 706a-706b. Thus, one or more of the relay UEs 706a-706b may retransmit the retransmitted PDSCH received from the base station 702 to the target UE 704 on the configured resources. In examples, the one or more relay UEs 706a-706b may retransmit the PDSCH received via the initial transmission. The PDSCH resources may be spatial division multiplexed (SDMed), frequency division multiplexed (FDMed), or time division multiplexed (TDMed) for the relay UEs 706a-706b to retransmit the PDSCH.

At 725, the target UE 704 may transmit an ACK on the configured resources (e.g., PUCCH) if the retransmission from the relay UEs 706a-706b, at 723, is decoded by the target UE 704. In some cases, the ACK may not be received by the base station 702, but may be received by one or more of the relay UEs 706a-706b. Hence, the ACK may be relayed, at 727, on the configured resource to the base station 702 if the relay UEs 706a-706b receive the ACK. At 727, the relay UE may optionally relay the feedback based on whether ACK/NACK from the target UE 704 is received, at 725, by the base station 702 or the relay UEs 706a-706b. While the relay UEs 706a-706b may be configured to perform retransmissions, such retransmissions may not occur in an absence of NACK-triggering.

Given that a single UL transmission (e.g., PUCCH/PUSCH) may include multiple ACK/NACK bits corresponding to multiple PDSCH transmissions, some of the bits in the UL transmission may correspond to ACKs and other bits in the UL transmission may correspond to NACKs. That is, the single UL transmission, which may include one bit for each of the multiple PDSCH transmissions, may have one or more ACK bits and/or one or more NACK bits. Therefore, the triggering mechanism for the SRS transmission from the UE in the diagram 500, the CSI-RS transmission from the base station in the diagram 600, and the sidelink retransmission from the relay UE in the diagram 700 may be based on the ACK/NACK of the single UL transmission.

Figure 8:
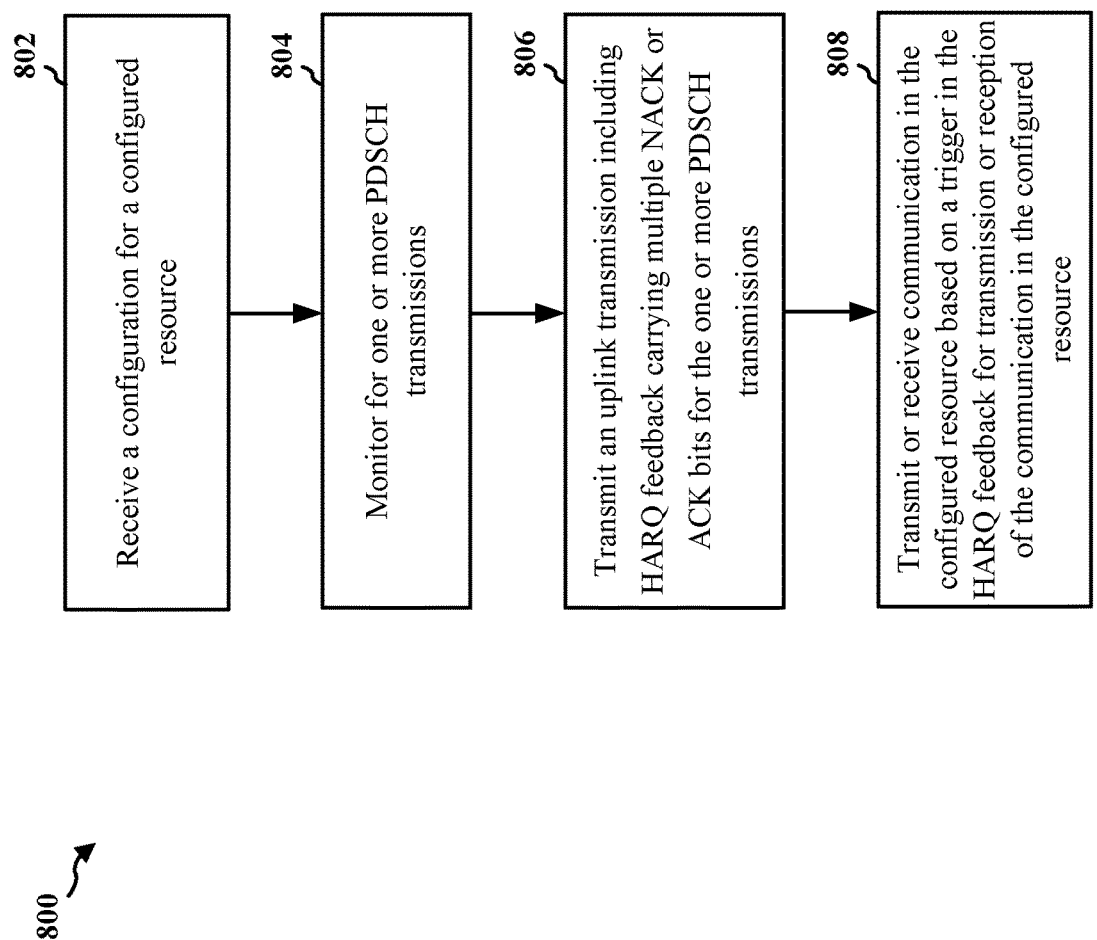
FIG. 8 is a flowchart of a method of wireless communication at a UE.

FIG. 8 is a flowchart 800 of a method of wireless communication. The method may be performed by a UE (e.g., the UE 104, 402, 704; the apparatus 1402), which may include the memory 360 and which may be the entire UE 104, 402, 704 or a component of the UE 104, 402, 704, such as the TX processor 368, the RX processor 356, and/or the controller/processor 359. The method may enable the UE 104, 402, 704 to exchange communication with the base station 102, 180, 404, the apparatus 1502, etc., following a multiple bit ACK/NACK feedback.

At 802, the UE receives a configuration for a resource. The resource may be referred to as a configured resource. The configured resource may be for SRS transmissions from the UE, e.g., as described in connection with the example in FIG. 5. The configured resource may be for CSI-RS from the base station and/or a CSI report from the UE, e.g., as described in connection with the example in FIG. 6. The configured resource may be for a sidelink retransmission of one or more PDSCH, e.g., as described in connection with the example in FIG. 7. The reception, at 802, may be performed by the reception component 1430 of the apparatus 1402 in FIG. 14.

At 804, the UE monitors for one or more PDSCH transmissions. FIG. 4 illustrates an example of a UE monitoring for PDSCH transmissions 407. In some examples, the PDSCH transmissions may be SPS transmissions. FIGS. 5-7 illustrate additional examples of a UE monitoring for PDSCH transmissions. The monitoring, at 804, may be performed by the monitor component 1440 of the apparatus 1402 in FIG. 14.

At 806, the UE transmits an uplink transmission including HARQ feedback carrying multiple NACK or ACK bits for the one or more PDSCH transmissions. FIG. 4 illustrates an example of a UE transmitting HARQ feedback for a plurality of PDSCH transmissions (e.g., including ACK/NACK bits). The transmission, at 806, may be performed by the transmission component 1434 of the apparatus 1402 in FIG. 14.

At 808, the UE transmits or receives communication in the configured resource based on a trigger in the HARQ feedback for transmission or reception of the communication in the configured resources. In some examples, the UE may transmit one or more SRSs on the configured resource based on the trigger associated with the HARQ feedback, e.g., as described in connection with the example in FIG. 5. In some examples, the UE may receive one or more CSI-RSs and transmit a corresponding CSI-RS report on the configured resource based on the trigger associated with the HARQ feedback, e.g., as described in connection with the example in FIG. 6. In some examples, the UE may monitor for a retransmission of a PDSCH from a relay UE in communication with a base station based on the trigger associated with the HARQ feedback, e.g., as described in connection with the example in FIG. 7. The transmission or reception, at 808, may be performed by the transmission component 1434, the reception component 1430 and/or the cellular RF transceiver 1422 of the apparatus 1402 in FIG. 14.

Figure 9:
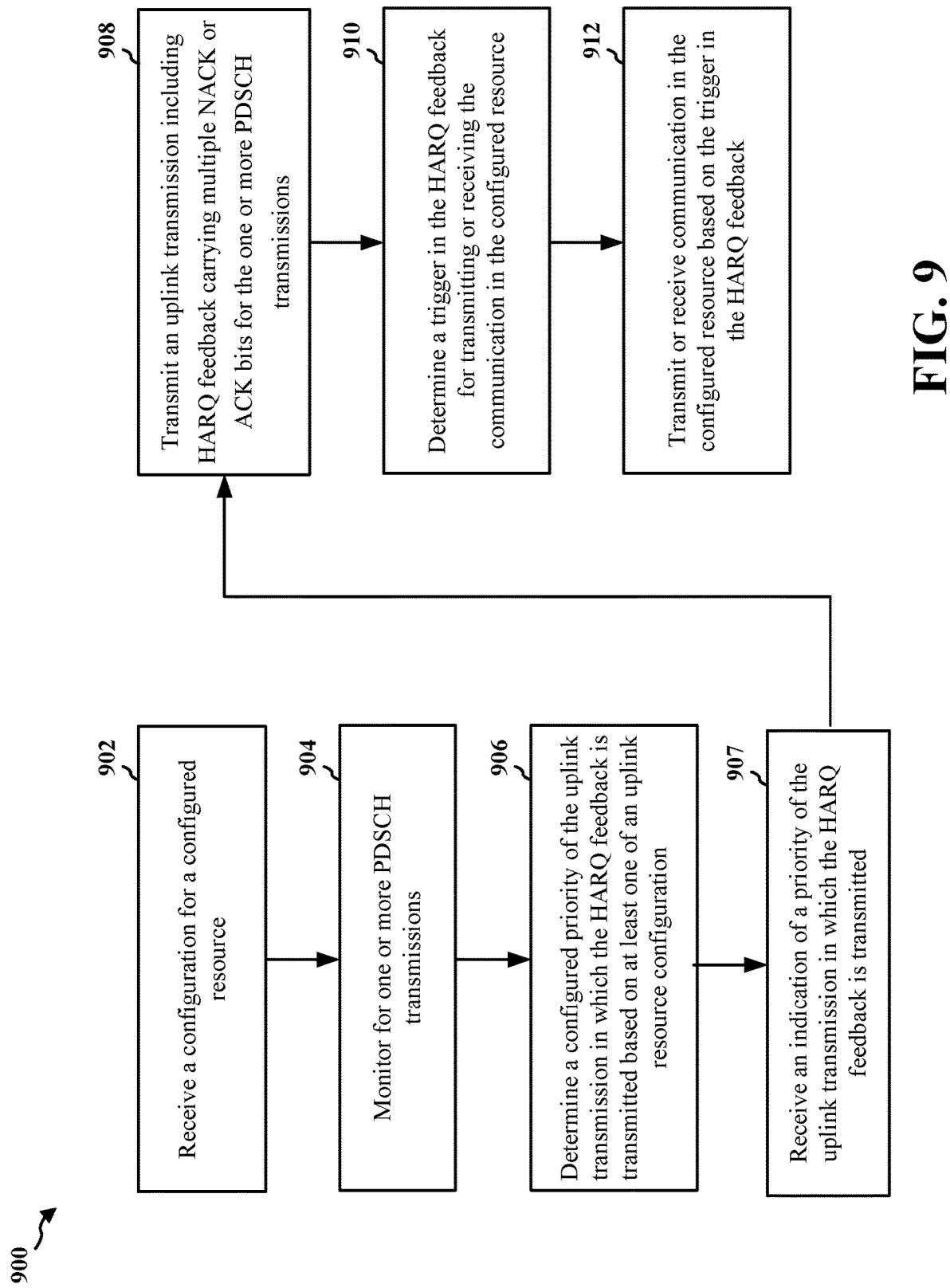
FIG. 9 is a flowchart of a method of wireless communication at a UE.

FIG. 9 is a flowchart 900 of a method of wireless communication. The method may be performed by a UE (e.g., the UE 104, 402, 704; the apparatus 1402), which may include the memory 360 and which may be the entire UE 104, 402, 704 or a component of the UE 104, 402, 704, such as the TX processor 368, the RX processor 356, and/or the controller/processor 359. The method may enable the UE 104, 402, 704 to exchange communication with the base station 102, 180, 404, the apparatus 1502, etc., following a multiple bit ACK/NACK feedback.

At 902, the UE receives a configuration for a resource. The resource may be referred to as a configured resource. The configured resource may be for SRS transmissions from the UE, e.g., as described in connection with the example in FIG. 5. The configured resource may be for CSI-RS from the base station and/or a CSI report from the UE, e.g., as described in connection with the example in FIG. 6. The configured resource may be for a sidelink retransmission of one or more PDSCH, e.g., as described in connection with the example in FIG. 7. The reception, at 902, may be performed by the reception component 1430 of the apparatus 1402 in FIG. 14.

At 904, the UE monitors for one or more PDSCH transmissions. FIG. 4 illustrates an example of a UE monitoring for PDSCH transmissions 407. In some examples, the PDSCH transmissions may be SPS transmissions. FIGS. 5-7 illustrate additional examples of a UE monitoring for PDSCH transmissions. The monitoring, at 904, may be performed by the monitor component 1440 of the apparatus 1402 in FIG. 14.

At 908, the UE transmits an uplink transmission including HARQ feedback carrying multiple NACK or ACK bits for the one or more PDSCH transmissions. FIG. 4 illustrates an example of a UE transmitting HARQ feedback for a plurality of PDSCH transmissions (e.g., including ACK/NACK bits). The transmission, at 908, may be performed by the transmission component 1434 of the apparatus 1402 in FIG. 14.

At 910, the UE determines a trigger in the HARQ feedback for transmitting or receiving the communication in the configured resource. The trigger may be based on at least one of the multiple NACK or ACK bits of the HARQ feedback corresponding to a NACK bit. The trigger may be based on each ACK/NACK bit of the HARQ feedback corresponding to a NACK bit. The trigger may be based on a percentage of NACK bits in the multiple NACK or ACK bits of the HARQ feedback exceeding a first threshold. The trigger may be based on at least one of the multiple NACK or ACK bits of the HARQ feedback corresponding to an ACK bit. The trigger may be based on each ACK/NACK bit of the HARQ feedback corresponding to an ACK bit. The trigger may be based on a percentage of ACK bits in the multiple NACK or ACK bits of the HARQ feedback exceeding a second threshold. The first threshold and the second threshold may be the same or may be different. The determination, at 910, may be performed by the determination component 1442 of the apparatus 1402 in FIG. 14.

The threshold, e.g., of NACK bits or ACK bits, may be a fixed and/or predefined threshold. In some examples, the UE may receive the threshold(s) from the base station in one or more of DCI, a MAC-CE, or an RRC message. In some examples, the UE may signal the threshold(s) to the base station in at least one of UCI, a MAC-CE, or an RRC message. The UE may determine the trigger for transmitting or receiving the communication in the configured resource based on a HARQ-ACK codebook type, in some examples.

At 912, the UE transmits or receives communication in the configured resource based on the trigger in the HARQ feedback. In some examples, the UE may transmit one or more SRSs on the configured resource based on the trigger associated with the HARQ feedback, e.g., as described in connection with the example in FIG. 5. In some examples, the UE may receive one or more CSI-RSs and transmit a corresponding CSI-RS report on the configured resource based on the trigger associated with the HARQ feedback, e.g., as described in connection with the example in FIG. 6. In some examples, the UE may monitor for a retransmission of a PDSCH from a relay UE in communication with a base station based on the trigger associated with the HARQ feedback, e.g., as described in connection with the example in FIG. 7. The transmission or reception, at 912, may be performed by the transmission component 1434, the reception component 1430 and/or the cellular RF transceiver 1422 of the apparatus 1402 in FIG. 14.

The transmission or reception of the communication, at 912, may be further based on a priority level of the uplink resource (e.g., PUCCH or PUSCH) in which the HARQ feedback is transmitted. For example, the HARQ feedback may trigger the UE to monitor for a retransmission or a CSI-RS or to transmit an SRS or CSI report if the PUSCH or PUCCH carrying the ACK/NACK bits has a high priority and may skip monitoring for the retransmission/CSI-RS or transmission of the SRS/CSI report if the PUSCH/PUCCH carrying the ACK/NACK bits has a low priority.

In some examples, as illustrated at 906, the UE may determine a configured priority of the uplink transmission in which the HARQ feedback is transmitted based on at least one of an uplink resource configuration. FIG. 4 illustrates an example of a UE determining a priority of an UL transmission including HARQ feedback associated with multiple ACK/NACKs. The determination, at 906, may be performed by the determination component 1442 of the apparatus 1402 in FIG. 14.

In some examples, as illustrated at 907, the UE may receive an indication of a priority of the uplink transmission in which the HARQ feedback is transmitted based on at least one of an uplink resource configuration in a DCI associated with the one or more PDSCH transmissions. The reception, at 907, may be performed by the reception component 1430 of the apparatus 1402 in FIG. 14.

The priority may be a fixed and/or predefined priority. In some examples, the UE may receive the priority from the base station in one or more of DCI, a MAC-CE, or an RRC message. In other examples, the UE may signal the priority to the base station in at least one of uplink control information, a MAC-CE, or an RRC message.

Figure 10:
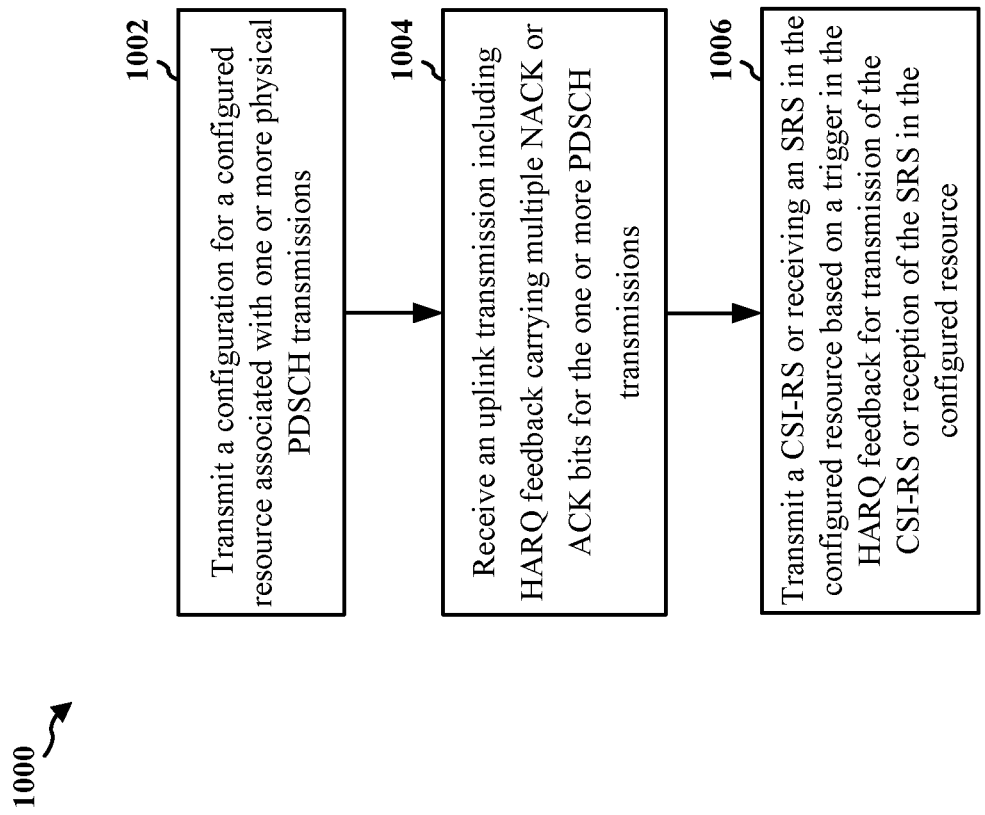
FIG. 10 is a flowchart of a method of wireless communication at a base station.

FIG. 10 is a flowchart 1000 of a method of wireless communication. The method may be performed by a base station (e.g., the base station 102, 180, 404, 702; the apparatus 1502; etc.), which may include the memory 376 and which may be the entire base station 102, 180, 404, 702 or a component of the base station 102, 180, 404, 702, such as the TX processor 316, the RX processor 370, and/or the controller/processor 375.

At 1002, the base station transmits a configuration for a resource associated with one or more physical PDSCH transmissions. The resource may be referred to as a configured resource. The configured resource may be for SRS transmissions from the UE, e.g., as described in connection with the example in FIG. 5. The configured resource may be for CSI-RS from the base station and/or a CSI report from the UE, e.g., as described in connection with the example in FIG. 6. The configured resource may be for a sidelink retransmission of one or more PDSCH, e.g., as described in connection with the example in FIG. 7. The transmission, at 1002, may be performed by the transmission component 1534 of the apparatus 1502 in FIG. 15.

At 1004, the base station receives, from a UE, an uplink transmission including HARQ feedback carrying multiple NACK or ACK bits for the one or more PDSCH transmissions. FIG. 4 illustrates that a base station may transmit one or more PDSCH transmissions to a UE. In some examples, the PDSCH transmissions may be SPS transmissions. The reception, at 1004, may be performed by the reception component 1530 of the apparatus 1502 in FIG. 15.

At 1006, the base station transmits a CSI-RS or receives an SRS in the configured resource based on a trigger in the HARQ feedback for transmission of the CSI-RS or reception of the SRS in the configured resource. The trigger may be based on at least one of the multiple NACK or ACK bits of the HARQ feedback corresponding to a NACK bit. The trigger may be based on each of the ACK/NACK bits of the HARQ feedback corresponding to a NACK bit. The trigger may be based on a percentage of NACK bits in the multiple NACK or ACK bits of the HARQ feedback exceeding a first threshold. The trigger may be based on at least one of the multiple NACK or ACK bits of the HARQ feedback corresponding to an ACK bit. The trigger may be based on each of the ACK/NACK bits of the HARQ feedback corresponding to an ACK bit. The trigger may be based on a percentage of ACK bits in the multiple NACK or ACK bits of the HARQ feedback exceeding a second threshold. The first and second thresholds may be the same or may be different.

The base station may receive one or more SRSs on the configured resource based on the trigger associated with the HARQ feedback, e.g., as described in connection with the example in FIG. 5. The base station may use the SRS to improve downlink transmissions to the UE, e.g., which may include a retransmission of at least one of the one or more PDSCH. For example, the base station may perform fast CC reselection using the SRS. The base station may transmit one or more CSI-RSs and receives a corresponding CSI-RS report on the configured resource based on the trigger associated with the HARQ feedback, e.g., as described in connection with the example in FIG. 5. The base station may use the CSI report to improve downlink transmissions to the UE, e.g., which may include a retransmission of at least one of the one or more PDSCH. For example, the base station may perform fast CC reselection using the CSI report. The transmission or reception, at 1006, may be performed by the cellular RF transceiver 1536 of the apparatus 1502 in FIG. 15.

Figure 11:
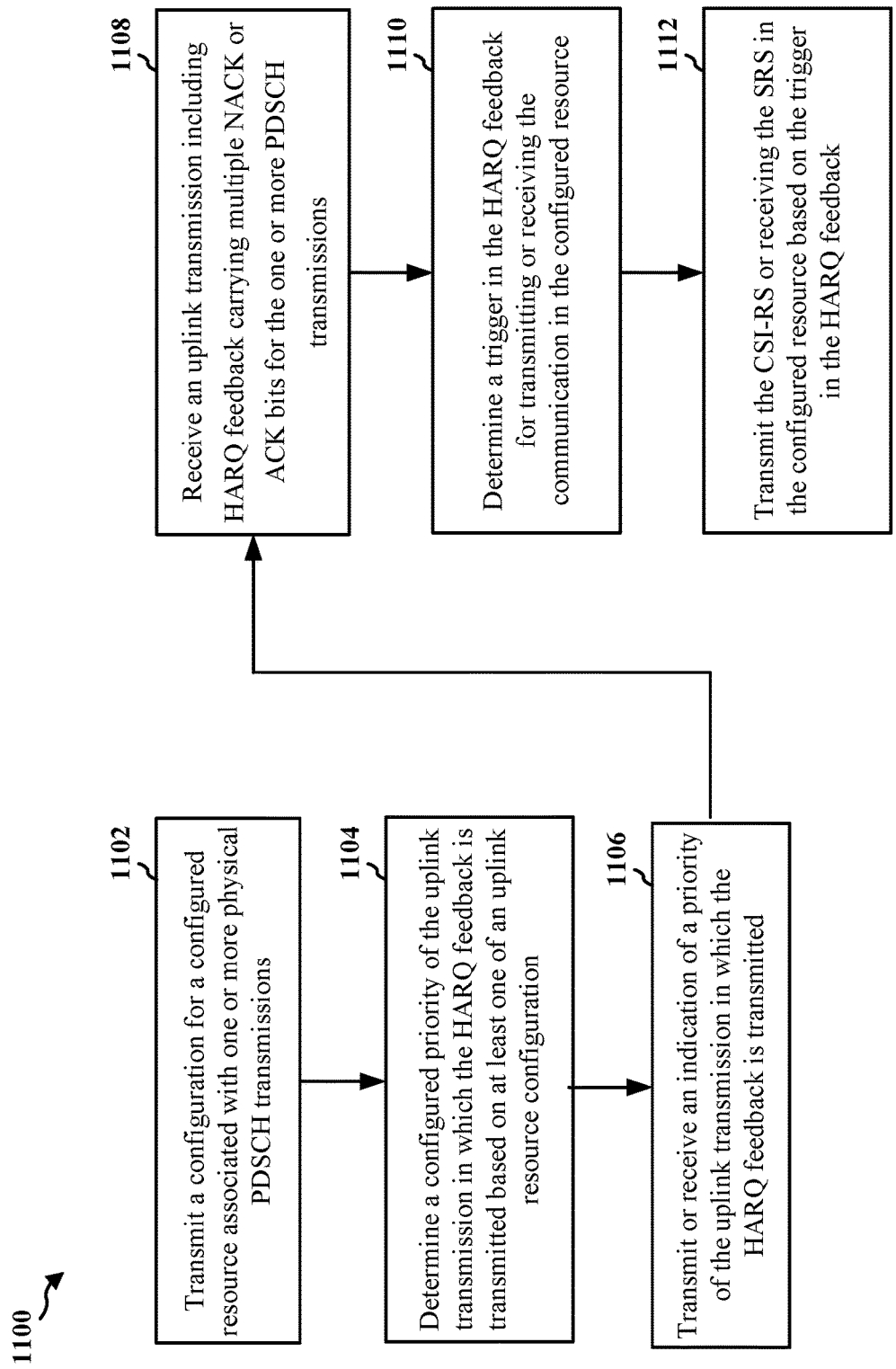
FIG. 11 is a flowchart of a method of wireless communication at a base station.

FIG. 11 is a flowchart 1100 of a method of wireless communication. The method may be performed by a base station (e.g., the base station 102, 180, 404, 702; the apparatus 1502; etc.), which may include the memory 376 and which may be the entire base station 102, 180, 404, 702 or a component of the base station 102, 180, 404, 702, such as the TX processor 316, the RX processor 370, and/or the controller/processor 375.

At 1102, the base station transmits a configuration for a resource associated with one or more physical PDSCH transmissions. The configured resource may be for SRS transmissions from the UE, e.g., as described in connection with the example in FIG. 5. The configured resource may be for CSI-RS from the base station and/or a CSI report from the UE, e.g., as described in connection with the example in FIG. 6. The configured resource may be for a sidelink retransmission of one or more PDSCH, e.g., as described in connection with the example in FIG. 7. The transmission, at 1102, may be performed by the transmission component 1534 of the apparatus 1502 in FIG. 15.

At 1108, the base station receives, from a UE, an uplink transmission including HARQ feedback carrying multiple NACK or ACK bits for the one or more PDSCH transmissions. FIG. 4 illustrates that a base station may transmit one or more PDSCH transmissions to a UE. In some examples, the PDSCH transmissions may be SPS transmissions. The reception, at 1108, may be performed by the reception component 1530 of the apparatus 1502 in FIG. 15.

At 1110, the base station determines a trigger in the HARQ feedback for transmitting a CSI-RS or receiving an SRS in the configured resource. The trigger may be based on at least one of the multiple NACK or ACK bits of the HARQ feedback corresponding to a NACK bit. The trigger may be based on each of the ACK/NACK bits of the HARQ feedback corresponding to a NACK bit. The trigger may be based on a percentage of NACK bits in the multiple NACK or ACK bits of the HARQ feedback exceeding a first threshold. The trigger may be based on at least one of the multiple NACK or ACK bits of the HARQ feedback corresponding to an ACK bit. The trigger may be based on each of the ACK/NACK bits of the HARQ feedback corresponding to an ACK bit. The trigger may be based on a percentage of ACK bits in the multiple NACK or ACK bits of the HARQ feedback exceeding a second threshold. The first and second thresholds may be the same or may be different. The determination, at 1110, may be performed by the trigger component 1532 of the apparatus 1502 in FIG. 15.

The threshold, e.g., of NACK bits or ACK bits, may be a fixed and/or predefined threshold. In some examples, the base station may transmit the threshold to the UE in one or more of DCI, a MAC-CE, or an RRC message. In some examples, the base station may receive the threshold from the UE in at least one of UCI, a MAC-CE, or an RRC message. The base station may determine the trigger for transmitting or receiving the communication in the configured resource based on a HARQ-ACK codebook type, in some examples.

At 1112, the base station transmits the CSI-RS or receives the SRS in the configured resource based on the trigger in the HARQ feedback. The base station may receive one or more SRSs on the configured resource based on the trigger associated with the HARQ feedback, e.g., as described in connection with the example in FIG. 5. The base station may use the SRS to improve downlink transmissions to the UE, e.g., which may include a retransmission of at least one of the one or more PDSCH. For example, the base station may perform fast CC reselection using the SRS. The base station may transmit one or more CSI-RSs and receives a corresponding CSI-RS report on the configured resource based on the trigger associated with the HARQ feedback, e.g., as described in connection with the example in FIG. 5. The base station may use the CSI report to improve downlink transmissions to the UE, e.g., which may include a retransmission of at least one of the one or more PDSCH. For example, the base station may perform fast CC reselection using the CSI report. The transmission or reception, at 1112, may be performed by the cellular RF transceiver 1536 of the apparatus 1502 in FIG. 15.

The transmission or reception, which occurs at 1112, may be further based on a priority level of the uplink resource (e.g., PUCCH or PUSCH) in which the HARQ feedback is received. For example, the HARQ feedback may trigger the base station to monitor for a SRS or transmit a CSI-RS if the PUSCH or PUCCH carrying the ACK/NACK bits has a high priority and may skip monitoring for the SRS or transmitting the CSI-RS if the PUSCH/PUCCH carrying the ACK/NACK bits has a low priority.

A priority of the uplink transmission in which the HARQ feedback is received may be configured based on at least one of an uplink resource configuration, e.g., and may be determined by the base station at 1104. The determination, at 1104, may be performed by the reception component 1530 of the apparatus 1502 in FIG. 15. As illustrated at 1106, the base station may transmit an indication of a priority of the uplink transmission in which the HARQ feedback is received based on an uplink resource configuration in a DCI associated with the one or more PDSCH transmissions.

The priority may be a fixed and/or predefined priority. The base station may transmit the priority to the UE, e.g., at 1106, in one or more of DCI, MAC-CE, or RRC message. In some examples, at 1106, the base station may receive the priority from the UE in at least one of UCI, MAC-CE, or RRC message. The transmission or reception, at 1106, may be performed by the cellular RF transceiver 1536 of the apparatus 1502 in FIG. 15.

In some examples, the base station may receive the uplink transmission including the HARQ feedback for the one or more PDSCH transmissions from a relay UE in communication with a UE based on the trigger associated with the HARQ feedback, e.g., as described in connection with the example in FIG. 7.

Figure 12:
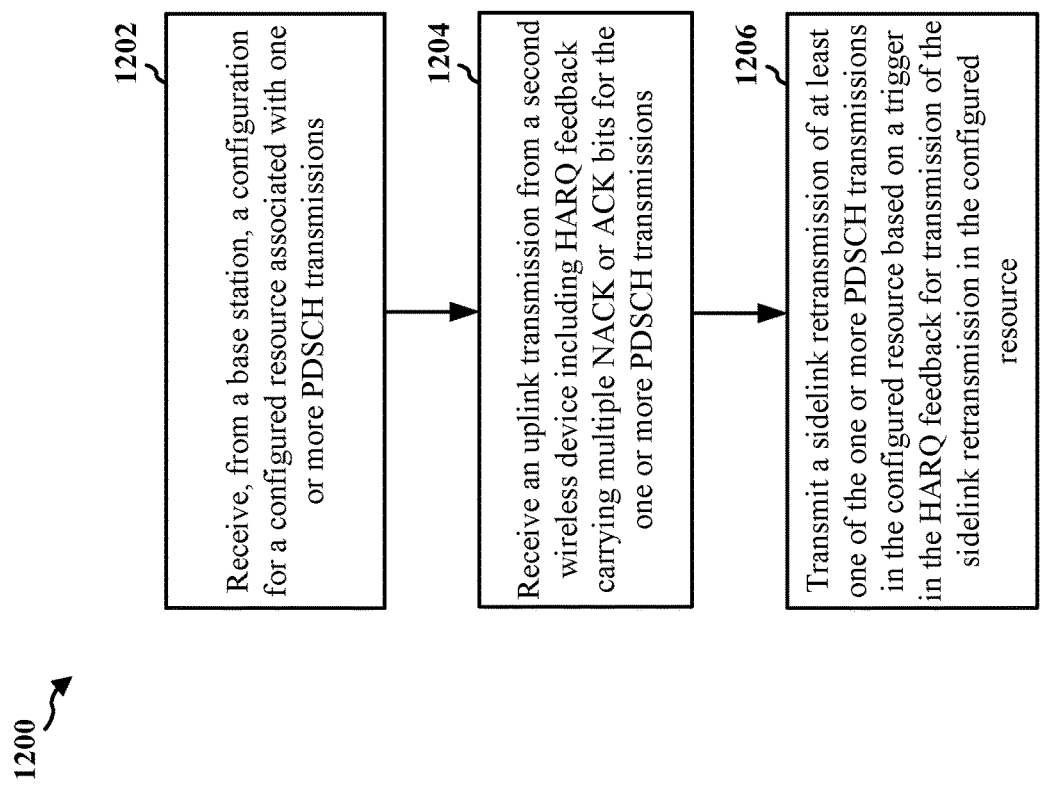
FIG. 12 is a flowchart of a method of wireless communication at a wireless device.

FIG. 12 is a flowchart 1200 of a method of wireless communication. The method may be performed by a first wireless device (e.g., the UE 104, a sidelink device, a relay UE 403, 706a, 706b, the apparatus 1602, etc.), which may include the memory 360/376 and which may be the entire first wireless device or a component of the first wireless device, such as the TX processor 368/316, the RX processor 356/370, and/or the controller/processor 359/375.

At 1202, the first wireless device receives, from a base station, a configuration for a resource associated with one or more PDSCH transmissions. The resources may be for sidelink retransmissions, e.g., as described in connection with the examples in FIGS. 4 and/or 7. The reception, at 1202, may be performed by the reception component 1630 of the apparatus 1602 in FIG. 16.

At 1204, the first wireless device receives an uplink transmission from a second wireless device including HARQ feedback carrying multiple NACK or ACK bits for the one or more PDSCH transmissions. FIG. 4 illustrates a relay UE that receives HARQ feedback for a plurality of PDSCH transmissions (e.g., including ACK/NACK) bits from a UE. The reception, at 1204, may be performed by the reception component 1630 of the apparatus 1602 in FIG. 16.

At 1206, the first wireless device transmits a sidelink retransmission of at least one of the one or more PDSCH transmissions in the configured resource based on a trigger in the HARQ feedback for transmission of the sidelink retransmission in the configured resources. The first wireless device may be a UE that transmits the sidelink retransmission as a relay from the base station to the second wireless device or from the second wireless device to the base station or from the second wireless device to the base station. For example, the first wireless device may perform the aspects described for the relay UE in FIG. 4 and/or FIG. 7. In some examples, the first wireless device may receive ACK/NACK feedback for the retransmission from the second wireless device and may provide the ACK/NACK feedback to the base station, e.g., as described in connection with FIG. 4 and/or FIG. 7. The transmission, at 1206, may be performed by the transmission component 1634 of the apparatus 1602 in FIG. 16. The trigger may be based on at least one of the multiple NACK or ACK bits of the HARQ feedback corresponding to a NACK bit. The trigger may be based on each bit of the HARQ feedback corresponding to a NACK bit. The trigger may be based on a percentage of NACK bits in the multiple NACK or ACK bits of the HARQ feedback exceeding a first threshold. The trigger may be based on at least one of the multiple NACK or ACK bits of the HARQ feedback corresponding to an ACK bit. The trigger may be based on each bit of the HARQ feedback corresponding to an ACK bit. The trigger may be based on a percentage of ACK bits in the multiple NACK or ACK bits of the HARQ feedback exceeding a second threshold. The first threshold and the second threshold may be the same or may be different.

Figure 13:
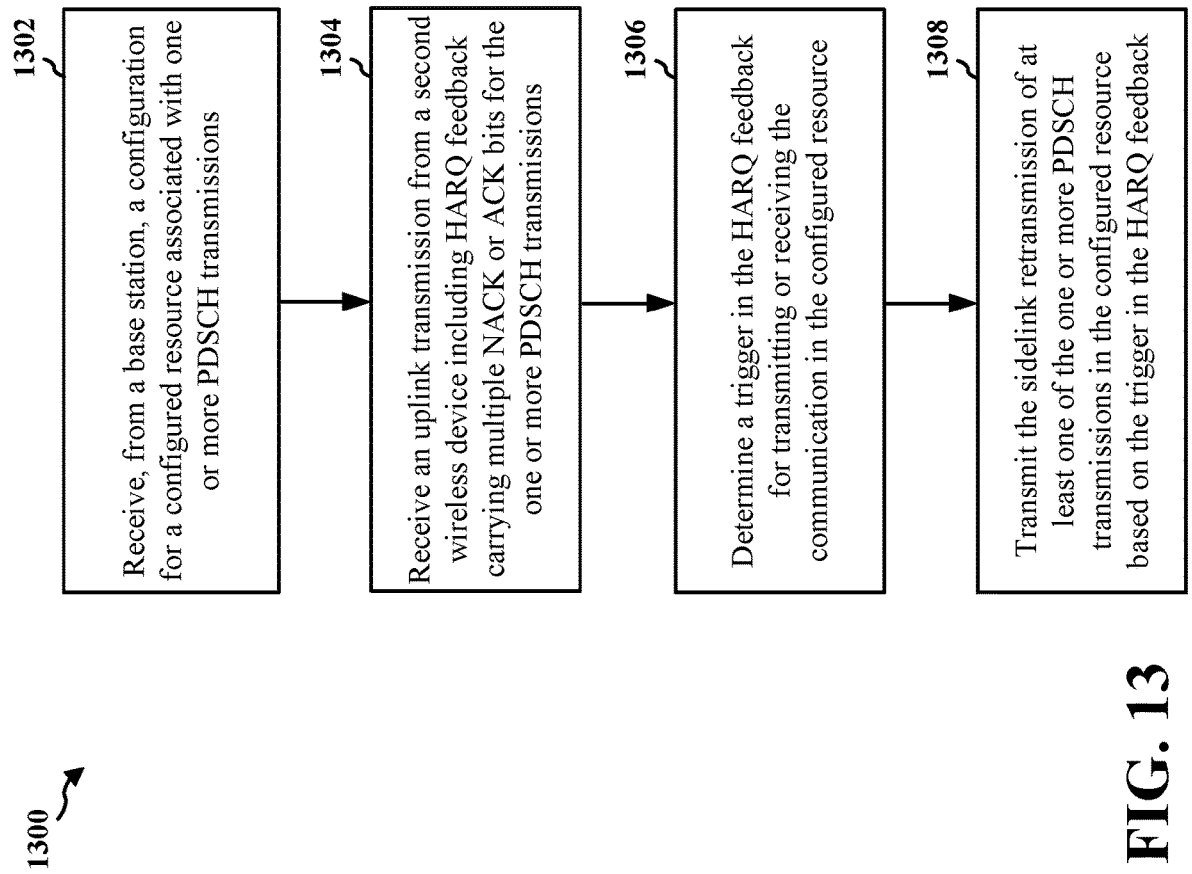
FIG. 13 is a flowchart of a method of wireless communication at a wireless device.

FIG. 13 is a flowchart 1300 of a method of wireless communication. The method may be performed by a first wireless device (e.g., the UE 104, a sidelink device, a relay UE 403, 706a, 706b, the apparatus 1602, etc.), which may include the memory 360/376 and which may be the entire first wireless device or a component of the first wireless device, such as the TX processor 368/316, the RX processor 356/370, and/or the controller/processor 359/375.

At 1302, the first wireless device receives, from a base station, a configuration for a resource associated with one or more PDSCH transmissions. The resources may be for sidelink retransmissions, e.g., as described in connection with the examples in FIGS. 4 and/or 7. The reception, at 1302, may be performed by the reception component 1630 of the apparatus 1602 in FIG. 16.

At 1304, the first wireless device receives an uplink transmission from a second wireless device including HARQ feedback carrying multiple NACK or ACK bits for the one or more PDSCH transmissions. FIG. 4 illustrates a relay UE that receives HARQ feedback for a plurality of PDSCH transmissions (e.g., including ACK/NACK) bits from a UE. The reception, at 1304, may be performed by the reception component 1630 of the apparatus 1602 in FIG. 16.

At 1306, the first wireless device determines a trigger in the HARQ feedback for transmitting a sidelink retransmission in the configured resource. The trigger may be based on at least one of the multiple NACK or ACK bits of the HARQ feedback corresponding to a NACK bit. The trigger may be based on each ACK/NACK bit of the HARQ feedback corresponding to a NACK bit. The trigger may be based on a percentage of NACK bits in the multiple NACK or ACK bits of the HARQ feedback exceeding a first threshold. The trigger may be based on at least one of the multiple NACK or ACK bits of the HARQ feedback corresponding to an ACK bit. The trigger may be based on each ACK/NACK bit of the HARQ feedback corresponding to an ACK bit. The trigger may be based on a percentage of ACK bits in the multiple NACK or ACK bits of the HARQ feedback exceeding a second threshold. The first threshold and the second threshold may be the same or may be different. The determination, at 1306, may be performed by the determination component 1642 of the apparatus 1602 in FIG. 16.

The threshold, e.g., of NACK bits or ACK bits, may be a fixed and/or predefined threshold. In some examples, the first wireless device may receive the threshold from the base station in one or more of DCI, a MAC-CE, or an RRC message. In some examples, the first wireless device may receive the threshold from the second wireless device in at least one of UCI, a MAC-CE, or an RRC message. The UE may determine the trigger for transmitting or receiving the communication in the configured resource based on a HARQ-ACK codebook type, in some examples.

At 1308, the first wireless device transmits the sidelink retransmission of at least one of the one or more PDSCH transmissions in the configured resource based on the trigger in the HARQ feedback. The first wireless device may be a UE that transmits the sidelink retransmission as a relay from the base station to the second wireless device or from the second wireless device to the base station or from the second wireless device to the base station. For example, the first wireless device may perform the aspects described for the relay UE in FIG. 4 and/or FIG. 7.

The transmission of the sidelink retransmission, at 1308, may be further based on a priority level of the uplink resource (e.g., PUCCH or PUSCH) in which the HARQ feedback is received. For example, the HARQ feedback may trigger the sidelink retransmission if the PUSCH or PUCCH carrying the ACK/NACK bits has a high priority and the first wireless device may skip the sidelink retransmission if the PUSCH/PUCCH carrying the ACK/NACK bits has a low priority.

In some examples, the first wireless device may receive ACK/NACK feedback for the retransmission from the second wireless device and may provide the ACK/NACK feedback to the base station, e.g., as described in connection with FIG. 4 and/or FIG. 7. The reception, at 1308, may be performed by the transmission component 1634 of the apparatus 1602 in FIG. 16.

Figure 14:
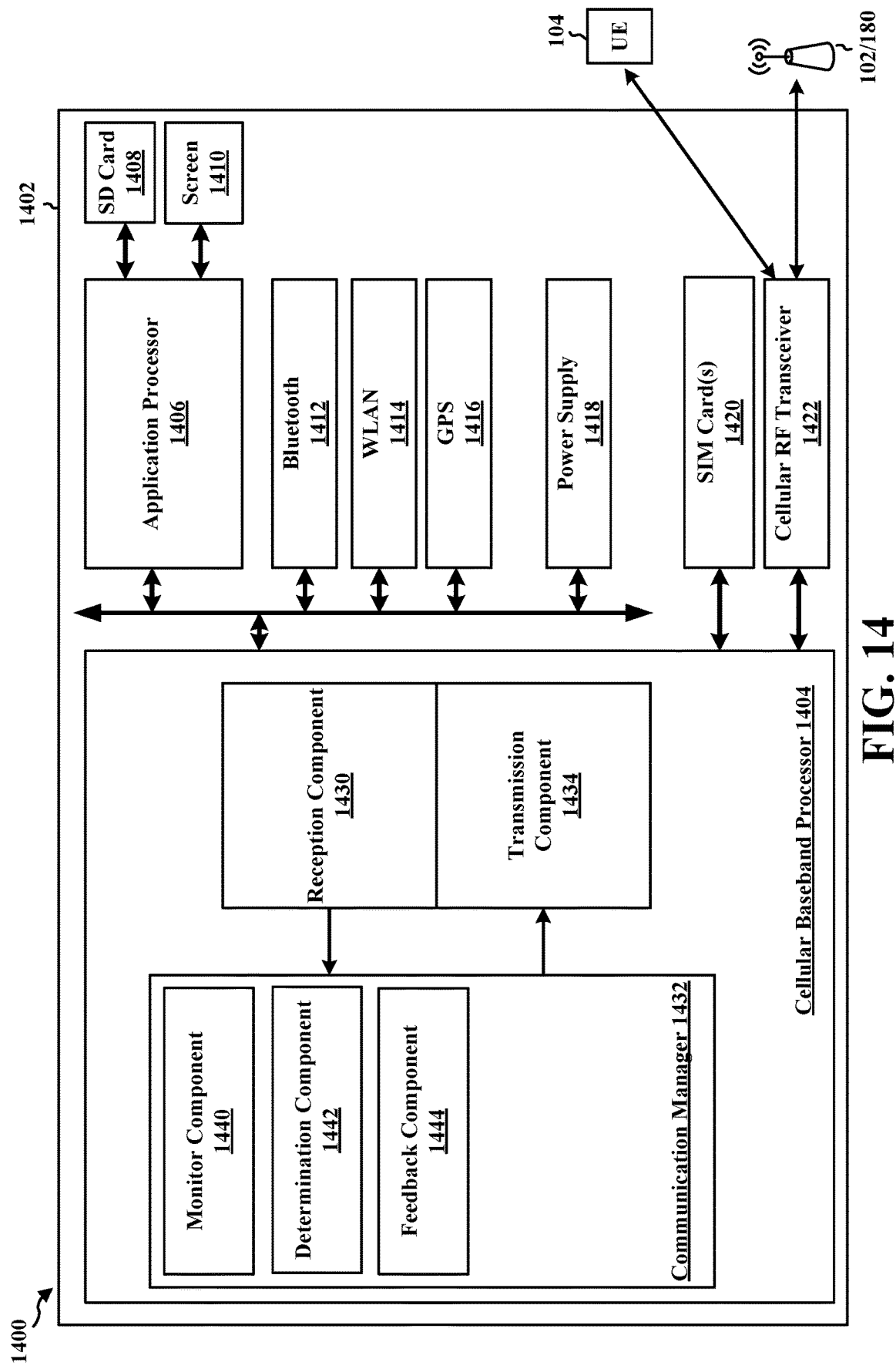
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The reception component 1430 may be configured, e.g., as described in connection with 802, 902, and 907, to receive a configuration for a resource and/or to receive an indication of a priority of the uplink transmission with the HARQ feedback.

The communication manager 1432 includes a monitor component 1440 that is configured, e.g., as described in connection with 804 and 904, to monitor for one or more PDSCH transmissions. The communication manager 1432 further includes a feedback component 1444 that is configured to transmit an uplink transmission including HARQ feedback carrying multiple NACK or ACK bits for the one or more PDSCH transmissions. The communication manager 1432 further includes a determination component 1442 that is configured, e.g., as described in connection with 906 and 910, to determine a trigger in the HARQ feedback for transmitting or receiving communication in the configured resource.

The transmission component 1434 and/or the reception component 1430 may be configured, e.g., as described in connection with 808 and 912 to transmit or receive communication in the configured resource based on the trigger in the HARQ feedback. The cellular RF transceiver 1422 may be configured, e.g., as described in connection with 808 and 912, to transmit or receive the communication in the configured resource based on the HARQ feedback, for example.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
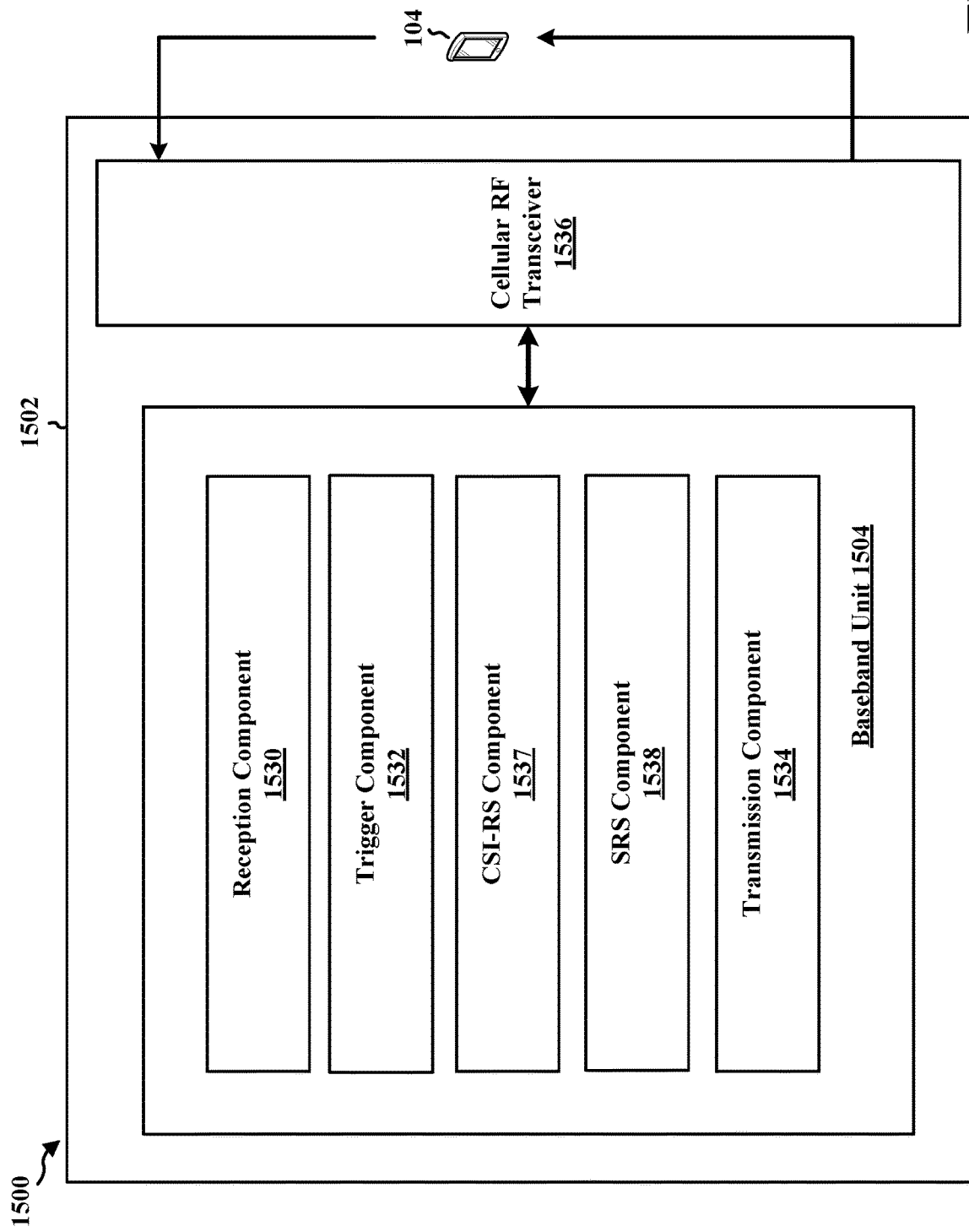
FIG. 15 is a diagram illustrating an example of a hardware implementation for an example apparatus.

The apparatus 1402, and in particular the cellular baseband processor 1404, includes means for receiving a configuration for a resource; means for monitoring for one or more PDSCH transmissions; means for transmitting an uplink transmission including HARQ feedback carrying multiple NACK or acknowledgement ACK bits for the one or more PDSCH transmissions; means for determining a trigger in the HARQ feedback for transmitting or receiving the communication in the configured resource; and means for transmitting or receiving communication in the configured resource based on the trigger in the HARQ feedback. The apparatus 1302 may further includes means for determining a priority of the uplink transmission in which the HARQ feedback is transmitted, e.g., as described in connection with 906 or 907 in FIG. 9. The aforementioned means may be one or more of the aforementioned components of the apparatus 1402 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1536 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager, and a transmission component 1534. The communication manager includes the one or more illustrated components. The components within the communication manager may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The transmission component 1534 may be configured, e.g., as described in connection with 1002 and 1102, to transmit a configuration for a resource associated with a PDSCH transmissions.

The reception component 1530 may be configured, e.g., as described in connection with 1004 and 1108, to receive an uplink transmission including HARQ feedback carrying multiple NACK or ACK bits for the one or more PDSCH transmissions. A trigger component 1532 may be configured to determine a trigger in the HARQ feedback for transmitting or receiving the communication in the configured resource, e.g., as described in connection with 1110. The apparatus may include a CSI-RS component 1537 configured to transmit CSI-RS is the configured resources based on the trigger, e.g., as described in connection with 1006 and 1112. The apparatus may include an SRS component 1538 configured to receive SRS based on the trigger, e.g., as described in connection with 1006 and 1112. The cellular RF transceiver 1536 may be configured, e.g., as described in connection with 1006 and 1112, to transmit a CSI-RS and/or receive an SRS in the configured resource based on the trigger in the HARQ feedback.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1502, and in particular the baseband unit 1504, includes means for transmitting a configuration for a resource associated with one or more PDSCH transmissions; means for receiving, from a UE, an uplink transmission including HARQ feedback carrying multiple NACK or ACK bits for the one or more PDSCH transmissions; means for determining a trigger in the HARQ feedback for transmitting a CSI-RS or receiving a SRS in the configured resource; and means for transmitting the CSI-RS or receiving the SRS in the configured resource based on the trigger in the HARQ feedback. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
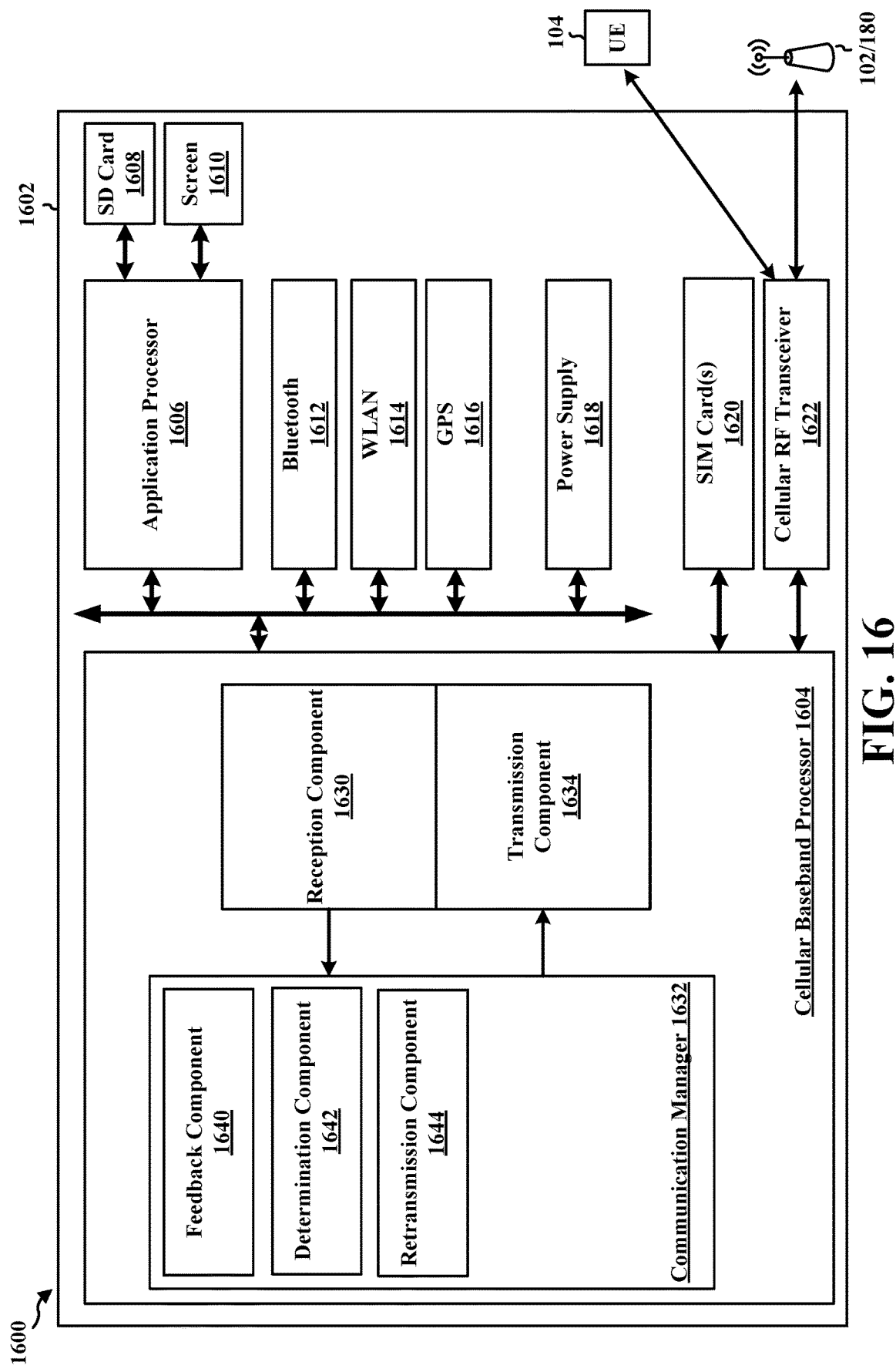
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The reception component 1630 may be configured to receive, from a base station, a configuration for a resource associated with one or more PDSCH transmissions, e.g., as described in connection with 1202 and 1302. The apparatus 1602 may further include a feedback component 1640 configured to receive an uplink transmission from a second wireless device including HARQ feedback carrying multiple NACK or ACK bits for the one or more PDSCH transmissions, e.g., as described in connection with 1204 and 1304. The apparatus 1602 may include a determination component 1642 configured to determine a trigger in the HARQ feedback for transmitting a sidelink retransmission in the configured resource, e.g., as described in connection with 1306. The apparatus may include a retransmission component 1644 configured to transmit the sidelink retransmission of at least one of the one or more PDSCH transmissions in the configured resource based on the trigger in the HARQ feedback, e.g., as described in connection with 1206 and 1308.

The apparatus may include additional components that perform each of the blocks of the algorithm in the aforementioned flowcharts of FIGS. 12-13. As such, each block in the aforementioned flowcharts of FIGS. 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for receiving, from a base station, a configuration for a resource associated with one or more PDSCH transmissions; means for receiving an uplink transmission from a second wireless device including HARQ feedback carrying multiple NACK or ACK bits for the one or more PDSCH transmissions; means for determining a trigger in the HARQ feedback for transmitting a sidelink retransmission in the configured resource; and means for transmitting the sidelink retransmission of at least one of the one or more PDSCH transmissions in the configured resource based on the trigger in the HARQ feedback. The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other examples or teaching described herein, without limitation.

Aspect 1 is a method of wireless communication at a user equipment (UE), comprising: receiving a configuration for a resource; monitoring for one or more PDSCH transmissions; transmitting an uplink transmission including hybrid automatic repeat request (HARQ) feedback carrying multiple negative-acknowledgment (NACK) or acknowledgement ACK bits for the one or more PDSCH transmissions; determining a trigger in the HARQ feedback for transmitting or receiving the communication in the resource; and transmitting or receiving communication in the resource based on the trigger in the HARQ feedback.

In Aspect 2, the method of Aspect 1 further includes that the trigger is based on at least one of the multiple NACK or ACK bits of the HARQ feedback corresponding to a NACK bit.

In Aspect 3, the method of Aspect 1 further includes that the trigger is based on each of the multiple NACK or ACK bits of the HARQ feedback corresponding to a NACK bit.

In Aspect 4, the method of Aspect 1 further includes that the trigger is based on a percentage of NACK bits in the multiple NACK or ACK bits of the HARQ feedback exceeding a threshold.

In Aspect 5, the method of Aspect 4, further includes that the threshold is at least one of a fixed or predefined threshold.

In Aspect 6, the method of Aspect 4 or 5, further includes that the UE receives the threshold from the base station in one or more of downlink control information (DCI), a medium access control-control element (MAC-CE), or a radio resource control (RRC) message.

In Aspect 7, the method of any of Aspects 4-6, further includes that the UE signals the threshold to the base station in at least one of uplink control information, a medium access control-control element (MAC-CE), or a radio resource control (RRC) message.

In Aspect 8, the method of any of Aspects 1-7, further includes that the UE determines the trigger for transmitting or receiving the communication in the resource based on a HARQ-acknowledgment (ACK) (HARQ-ACK) codebook type.

In Aspect 9, the method of any of Aspects 1-8 further include determining a preconfigured priority of the uplink transmission in which the HARQ feedback is transmitted based on at least one of an uplink resource configuration, wherein transmission or reception in the resource is further based on a priority of the uplink transmission in which the HARQ feedback is transmitted.

In Aspect 10, the method of any of Aspects 1-9 further include receiving an indication of a priority of the uplink transmission in which the HARQ feedback is transmitted based on at least one of an uplink resource configuration in a downlink control information (DCI) associated with the one or more PDSCH transmissions wherein transmission or reception in the resource is further based on the priority of the uplink transmission in which the HARQ feedback is transmitted.

In Aspect 11, the method of any of Aspects 1-10 further include that the priority is at least one of a fixed or predefined priority wherein transmission or reception in the resource is further based on the priority of the uplink transmission in which the HARQ feedback is transmitted.

In Aspect 12, the method of any of Aspects 1-11 further include that the UE receives the priority from the base station in one or more of downlink control information (DCI), a medium access control-control element (MAC-CE), or a radio resource control (RRC) message wherein transmission or reception in the resource is further based on the priority of the uplink transmission in which the HARQ feedback is transmitted.

In Aspect 13, the method of any of Aspects 1-12 further include that the UE signals the priority to the base station in at least one of uplink control information, a medium access control-control element (MAC-CE), or a radio resource control (RRC) message wherein transmission or reception in the resource is further based on the priority of the uplink transmission in which the HARQ feedback is transmitted.

In Aspect 14, the method of any of Aspects 1-13 further include that the UE transmits one or more sounding reference signals (SRSs) on the resource based on the trigger associated with the HARQ feedback.

In Aspect 15, the method of any of Aspects 1-14 further include that the UE receives one or more channel state information (CSI)-reference signals (RSs) (CSI-RSs) and transmits a corresponding CSI-RS report on the resource based on the trigger associated with the HARQ feedback.

In Aspect 16, the method of any of Aspects 1-15 further include that the UE monitors for a retransmission of a physical downlink shared channel (PDSCH) from a relay UE in communication with a base station based on the trigger associated with the HARQ feedback.

In Aspect 17, the method of any of Aspects 1-16 further include that the trigger is based on at least one of the multiple NACK or ACK bits of the HARQ feedback corresponding to an ACK bit.

In Aspect 18, the method of any of Aspects 1-17 further include that the trigger is based on each of the multiple NACK or ACK bits of the HARQ feedback corresponding to an ACK bit.

In Aspect 19, the method of any of Aspects 1-18 further include that the trigger is based on a percentage of ACK bits in the multiple NACK or ACK bits of the HARQ feedback exceeding a threshold.

Aspect 20 is a device including one or more processors and one or more memories in electronic communication with the one or more processors storing instructions executable by the one or more processors to cause the device to implement a method as in any of Aspects 1-19.

Aspect 21 is a system or apparatus including means for implementing a method or realizing an apparatus as in any of Aspects 1-19.

Aspect 22 is a non-transitory computer readable medium storing instructions executable by one or more processors to cause the one or more processors to implement a method as in any of Aspects 1-19.

Aspect 23 is a method of wireless communication at a base station, comprising: transmitting a configuration for a resource associated with one or more physical downlink shared channel (PDSCH) transmissions; receiving, from a user equipment (UE), an uplink transmission including hybrid automatic repeat request (HARQ) feedback carrying multiple negative-acknowledgment (NACK) or acknowledgement ACK bits for the one or more PDSCH transmissions; determining a trigger in the HARQ feedback for transmitting a channel state information reference signal (CSI-RS) or receiving a sounding reference signal (SRS) in the resource; and transmitting the CSI-RS or receiving the SRS in the resource based on the trigger in the HARQ feedback.

In Aspect 24, the method of Aspect 23 further includes that the trigger is based on at least one of the multiple NACK or ACK bits of the HARQ feedback corresponding to a NACK bit.

In Aspect 25, the method of Aspect 23 further includes that the trigger is based on each of the multiple NACK or ACK bits of the HARQ feedback corresponding to a NACK bit.

In Aspect 26, the method of Aspect 23 further includes that the trigger is based on a percentage of NACK bits in the multiple NACK or ACK bits of the HARQ feedback exceeding a threshold.

In Aspect 27, the method of Aspect 26 further includes that the threshold is at least one of a fixed or predefined threshold.

In Aspect 28, the method of any of Aspects 26-27 further includes that the base station transmits the threshold to the UE in one or more of downlink control information (DCI), a medium access control-control element (MAC-CE), or a radio resource control (RRC) message.

In Aspect 29, the method of any of Aspects 26-28 further includes that the base station receives the threshold from the UE in at least one of uplink control information, a medium access control-control element (MAC-CE), or a radio resource control (RRC) message.

In Aspect 30, the method of any of Aspects 23-29 further includes that the trigger is based on a HARQ-acknowledgment (ACK) (HARQ-ACK) codebook type.

In Aspect 31, the method of any of Aspects 23-30 further includes that a priority of the uplink transmission in which the HARQ feedback is received is preconfigured based on at least one of an uplink resource configuration, wherein transmission of the CSI-RS or reception of the SRS in the resource is further based on the priority of the uplink transmission in which the HARQ feedback is received.

In Aspect 32, the method of any of Aspects 23-31 further includes transmitting an indication of a priority of the uplink transmission in which the HARQ feedback is received based on an uplink resource configuration in a downlink control information (DCI) associated with the one or more PDSCH transmissions, wherein transmission of the CSI-RS or reception of the SRS in the resource is further based on the priority of the uplink transmission in which the HARQ feedback is received.

In Aspect 33, the method of any of Aspects 23-32 further includes that the priority is at least one of a fixed or predefined priority, wherein transmission of the CSI-RS or reception of the SRS in the resource is further based on the priority of the uplink transmission in which the HARQ feedback is received.

In Aspect 34, the method of any of Aspects 23-33 further includes that the base station transmits the priority to the UE in one or more of downlink control information (DCI), a medium access control-control element (MAC-CE), or a radio resource control (RRC) message, wherein transmission of the CSI-RS or reception of the SRS in the resource is further based on the priority of the uplink transmission in which the HARQ feedback is received.

In Aspect 35, the method of any of Aspects 23-34 further includes that the base station receives the priority from the UE in at least one of uplink control information, a medium access control-control element (MAC-CE), or a radio resource control (RRC) message, wherein transmission of the CSI-RS or reception of the SRS in the resource is further based on the priority of the uplink transmission in which the HARQ feedback is received.

In Aspect 36, the method of any of Aspects 23-35 further includes that the base station receives one or more SRSs on the resource based on the trigger associated with the HARQ feedback.

In Aspect 37, the method of any of Aspects 23-36 further includes that the base station transmits one or more CSI-RSs and receives a corresponding CSI-RS report on the resource based on the trigger associated with the HARQ feedback.

In Aspect 38, the method of any of Aspects 23-37 further includes that the base station receives the uplink transmission including the HARQ feedback for the one or more PDSCH transmissions from a relay UE in communication with a UE based on the trigger associated with the HARQ feedback.

In Aspect 39, the method of any of Aspects 23-38 further includes that the trigger is based on at least one of the multiple NACK or ACK bits of the HARQ feedback corresponding to an ACK bit.

In Aspect 40, the method of any of Aspects 23-39 further includes that the trigger is based on each of the multiple NACK or ACK bits of the HARQ feedback corresponding to an ACK bit.

In Aspect 41, the method of any of Aspects 23-40 further includes that the trigger is based on a percentage of ACK bits in the multiple NACK or ACK bits of the HARQ feedback exceeding a threshold.

Aspect 42 is a device including one or more processors and one or more memories in electronic communication with the one or more processors storing instructions executable by the one or more processors to cause the device to implement a method as in any of Aspects 23-41.

Aspect 43 is a system or apparatus including means for implementing a method or realizing an apparatus as in any of Aspects 23-41.

Aspect 44 is a non-transitory computer readable medium storing instructions executable by one or more processors to cause the one or more processors to implement a method as in any of Aspects 23-41.

Aspect 45 is a method of wireless communication at a first wireless device, comprising: receiving, from a base station, a configuration for a resource associated with one or more physical downlink shared channel (PDSCH) transmissions; receiving an uplink transmission from a second wireless device including hybrid automatic repeat request (HARQ) feedback carrying multiple negative-acknowledgment (NACK) or acknowledgment (ACK) bits for the one or more PDSCH transmissions; determining a trigger in the HARQ feedback for transmitting a sidelink retransmission in the resource; and transmitting the sidelink retransmission of at least one of the one or more PDSCH transmissions in the resource based on the trigger in the HARQ feedback.

In Aspect 46, the method of Aspect 45 further includes that the first wireless device is a user equipment (UE) that transmits the sidelink retransmission as a relay from the base station to the second wireless device or from the second wireless device to the base station or from the second wireless device to the base station.

In Aspect 47, the method of Aspect 45 or Aspect 46 further includes that the trigger is based on at least one of the multiple NACK or ACK bits of the HARQ feedback corresponding to a NACK bit.

In Aspect 48, the method of Aspect 45 or Aspect 46 further includes that the trigger is based on each of the multiple NACK or ACK bits of the HARQ feedback corresponding to a NACK bit.

In Aspect 49, the method of Aspect 45 or Aspect 46 further includes that the trigger is based on a percentage of NACK bits in the multiple NACK or ACK bits of the HARQ feedback exceeding a threshold.

In aspect 50, the method of aspect 39 further includes receiving from a base station in one or more of downlink control information (DCI), a medium access control-control element (MAC-CE), or a radio resource control (RRC) message at least one of a first threshold percentage of NACK bits, a second threshold percentage of ACK bits, or a priority of the uplink transmission, wherein the retransmission is transmitted in the resource further based on the priority of the uplink transmission in which the HARQ feedback is received.

In aspect 51, the method of any of aspects 45-50 further includes that the trigger in the HARQ feedback is based on a HARQ-ACK codebook type.

In aspect 52, the method of any of aspects 45-49 or 51 further includes that the sidelink retransmission is transmitted based on a priority of the uplink transmission in which the HARQ feedback is transmitted, and the priority of the uplink transmission is based on an uplink resource configuration.

Aspect 53 is a device or apparatus including one or more processors and one or more memories in electronic communication with the one or more processors storing instructions executable by the one or more processors to cause the device to implement a method as in any of Aspects 45-42.

Aspect 54 is a System or apparatus including means for implementing a method or realizing an apparatus as in any of Aspects 45-52.

Aspect 55 is a non-transitory computer readable medium storing instructions executable by one or more processors to cause the one or more processors to implement a method as in any of Aspects 45-52.

What is claimed is:

1. An apparatus for wireless communication at a first wireless device, comprising:
   memory; and
   at least one processor coupled to the memory and based at least in part on instructions stored in the memory, the at least one processor is configured to:
   receive, from a base station, a configuration for a resource associated with one or more physical downlink shared channel (PDSCH) transmissions;
   receive an uplink transmission from a second wireless device including hybrid automatic repeat request (HARQ) feedback carrying at least one of (1) multiple negative-acknowledgment (NACK) bits or (2) multiple acknowledgment (ACK) bits for the one or more PDSCH transmissions; and
   transmit a sidelink retransmission of at least one of the one or more PDSCH transmissions in the resource based on a trigger in the HARQ feedback for transmission of the sidelink retransmission in the resource, wherein the trigger in the HARQ feedback for the transmission of the sidelink retransmission is based on a first percentage of NACK bits in the HARQ feedback exceeding a first threshold percentage of NACK bits or a second percentage of ACK bits in the HARQ feedback exceeding a second threshold percentage of ACK bits.

2. The apparatus of claim 1, wherein the first wireless device is a user equipment (UE), and wherein to transmit the sidelink retransmission, the at least one processor is configured to transmit the sidelink retransmission as a relay from the base station to the second wireless device or from the second wireless device to the base station.

3. The apparatus of claim 1, wherein the trigger is further based on at least one of the multiple NACK or the multiple ACK bits of the HARQ feedback corresponding to a NACK bit, or at least one of the multiple NACK bits or the multiple ACK bits of the HARQ feedback corresponding to an ACK bit.

4. The apparatus of claim 1, wherein the trigger is further based on each bit of the HARQ feedback corresponding to a NACK bit, or each bit of the HARQ feedback corresponding to an ACK bit.

5. The apparatus of claim 1, wherein the at least one processor is further configured to receive, from the base station in one or more of downlink control information (DCI), a medium access control-control element (MAC-CE), or a radio resource control (RRC) message, at least one of the first threshold percentage of NACK bits, the second threshold percentage of ACK bits, or a priority of the uplink transmission.

6. The apparatus of claim 1, wherein the trigger in the HARQ feedback is further based on a hybrid automatic repeat request-acknowledgment (HARQ-ACK) codebook type.

7. The apparatus of claim 1, wherein to transmit the sidelink retransmission, the at least one processor is configured to transmit the sidelink retransmission based on a priority of the uplink transmission in which the HARQ feedback is transmitted, wherein the priority of the uplink transmission is based on an uplink resource configuration.

8. An apparatus for wireless communication at a user equipment (UE), comprising:
   memory; and
   at least one processor coupled to the memory and based at least in part on instructions stored in the memory, the at least one processor is configured to:
   receive a configuration for a resource;
   monitor for one or more physical downlink shared channel (PDSCH) transmissions;
   transmit an uplink transmission including hybrid automatic repeat request (HARQ) feedback carrying at least one of (1) multiple negative-acknowledgment (NACK) bits or (2) multiple acknowledgement (ACK) bits for the one or more PDSCH transmissions; and
   transmit or receive communication in the resource based on a trigger in the HARQ feedback for transmission or reception of the communication in the resource, wherein the trigger in the HARQ feedback for the transmission or the reception of the communication in the resource is based on a first percentage of NACK bits in the HARQ feedback exceeding a first threshold percentage of NACK bits or a second percentage of ACK bits in the HARQ feedback exceeding a second threshold percentage of ACK bits.

9. The apparatus of claim 8, wherein the trigger is further based on at least one of the multiple NACK bits or the multiple ACK bits of the HARQ feedback corresponding to a NACK bit, or at least one of the multiple NACK bits or the multiple ACK bits of the HARQ feedback corresponding to an ACK bit.

10. The apparatus of claim 8, wherein the trigger is further based on each bit of the HARQ feedback corresponding to a NACK bit, or each bit of the HARQ feedback corresponding to an ACK bit.

11. The apparatus of claim 8, wherein the at least one processor is further configured to receive, from a base station in one or more of downlink control information (DCI), a medium access control-control element (MAC-CE), or a radio resource control (RRC) message, at least one of the first threshold percentage of NACK bits, the second threshold percentage of ACK bits, or a priority of the uplink transmission, and wherein to transmit or receive the communication in the resource, the at least one processor is configured to transmit or receive the communication in the resource further based on the priority of the uplink resource in which the HARQ feedback is transmitted.

12. The apparatus of claim 8, wherein the at least one processor is configured to signal, to a base station in at least one of uplink control information, a medium access control-control element (MAC-CE), or a radio resource control (RRC) message, at least one of the first threshold percentage of NACK bits or the second threshold percentage of ACK bits, or a priority of the uplink transmission, and wherein to transmit or receive the communication in the resource, the at least one processor is configured to transmit or receive the communication in the resource further based on the priority of the uplink resource in which the HARQ feedback is transmitted.

13. The apparatus of claim 8, wherein the at least one processor is further configured to receive an indication of a priority of the uplink transmission in which the HARQ feedback is transmitted based on an uplink resource configuration in a downlink control information (DCI) associated with the one or more PDSCH transmissions, and wherein to transmit or receive the communication in the resource, the at least one processor is configured to transmit or receive the communication in the resource further based on the priority of the uplink resource in which the HARQ feedback is transmitted.

14. The apparatus of claim 8, wherein the trigger in the HARQ feedback for the transmission or the reception of the communication in the configured resource is further based on a hybrid automatic repeat request-acknowledgment (HARQ-ACK) codebook type.

15. The apparatus of claim 8, wherein a configured priority of the uplink transmission in which the HARQ feedback is transmitted is based on an uplink resource configuration.

16. The apparatus of claim 8, wherein the at least one processor is configured to transmit one or more sounding reference signals (SRSs) on the resource based on the trigger in the HARQ feedback.

17. The apparatus of claim 8, wherein the at least one processor is configured to receive one or more channel state information (CSI)-reference signals (RSs) (CSI-RSs) and transmit a corresponding CSI-RS report on the resource further based on the trigger in the HARQ feedback.

18. The apparatus of claim 8, wherein the at least one processor is configured to monitor for a retransmission of a physical downlink shared channel (PDSCH) from a relay UE that communicates with a base station based on the trigger in the HARQ feedback.

19. An apparatus for wireless communication at a base station, comprising:
 memory; and
 at least one processor coupled to the memory and based at least in part on instructions stored in the memory, the at least one processor is configured to:
  transmit a configuration for a resource associated with one or more physical downlink shared channel (PDSCH) transmissions;
  receive, from a user equipment (UE), an uplink transmission including hybrid automatic repeat request (HARQ) feedback carrying at least one of (1) multiple negative-acknowledgment (NACK) bits or (2) multiple acknowledgement (ACK) bits for the one or more PDSCH transmissions; and
  transmit a channel state information-reference signal (CSI-RS) or receive a sounding reference signal (SRS) in the resource based on a trigger in the HARQ feedback for transmission of the CSI-RS or reception of the SRS in the resource, wherein the trigger in the HARQ feedback for the transmission of the CSI-RS or the reception of the SRS in the resource is based on a first percentage of NACK bits in the HARQ feedback exceeding a first threshold percentage of NACK bits or a second percentage of ACK bits in the HARQ feedback exceeding a second threshold percentage of ACK bits.

20. The apparatus of claim 19, wherein the trigger further is based on at least one of the multiple NACK bits or the multiple ACK bits of the HARQ feedback corresponding to a NACK bit, or at least one of the multiple NACK bits or the multiple ACK bits of the HARQ feedback corresponding to an ACK bit.

21. The apparatus of claim 19, wherein the trigger further is based on each bit of the HARQ feedback corresponding to a NACK bit, or each bit of the HARQ feedback corresponding to an ACK bit.

22. The apparatus of claim 19, wherein the at least one processor is configured to transmit, to the UE in one or more of downlink control information (DCI), a medium access control-control element (MAC-CE), or a radio resource control (RRC) message, at least one of the first threshold percentage of NACK bits, the second threshold percentage of ACK bits, or a priority of the uplink transmission, and wherein to transmit the CSI-RS or receive of the SRS in the resource, the at least one processor is configured to transmit the CSI-RS or receive the SRS further based on the priority of the uplink resource in which the HARQ feedback is transmitted.

23. The apparatus of claim 19, wherein the at least one processor is configured to receive, from the UE in at least one of uplink control information, a medium access control-control element (MAC-CE), or a radio resource control (RRC) message, at least one of the first threshold percentage of NACK bits, the second threshold of ACK bits, or a priority of the uplink transmission, and wherein to transmit the CSI-RS or receive the SRS in the resource, the at least one processor is configured to transmit the CSI-RS or receive the SRS further based on the priority of the uplink resource in which the HARQ feedback is transmitted.

24. The apparatus of claim 19, wherein the trigger is further based on a hybrid automatic repeat request-acknowledgment (HARQ-ACK) codebook type.

25. The apparatus of claim 19, wherein a priority of the uplink transmission in which the HARQ feedback is received is configured based on at least one of an uplink resource configuration, and wherein to transmit the CSI-RS or receive the SRS in the resource, the at least one processor is configured to transmit the CSI-RS or receive the SRS in the resource further based on the priority of the uplink resource in which the HARQ feedback is transmitted.

26. The apparatus of claim 19, wherein the at least one processor is configured, in response to the trigger in the HARQ feedback, to perform at least one of:
- receive one or more SRSs on the resource,
- transmit one or more CSI-RSs and receive a corresponding CSI-RS report on the resource, or
- receive the uplink transmission including the HARQ feedback for the one or more PDSCH transmissions from a relay UE that communicates with the UE.

27. A method of wireless communication at a user equipment (UE), comprising:
- receiving a configuration for a resource;
- monitoring for one or more physical downlink shared channel (PDSCH) transmissions;
- transmitting an uplink transmission including hybrid automatic repeat request (HARQ) feedback carrying at least one of (1) multiple negative-acknowledgment (NACK) bits or (2) multiple acknowledgement (ACK) bits for the one or more PDSCH transmissions; and
- transmitting or receiving communication in the resource based on a trigger in the HARQ feedback for transmitting or receiving the communication in the resource, wherein the trigger in the HARQ feedback for transmitting or receiving the communication in the resource is based on a first percentage of NACK bits in the HARQ feedback exceeding a first threshold percentage of NACK bits or a second percentage of ACK bits in the HARQ feedback exceeding a second threshold percentage of ACK bits.

* * * * *